United States Patent
Asakura et al.

(10) Patent No.: US 11,523,074 B2
(45) Date of Patent: Dec. 6, 2022

(54) SOLID-STATE IMAGING DEVICE, DRIVING METHOD, AND ELECTRONIC DEVICE

(71) Applicant: SONY SEMICONDUCTOR SOLUTIONS CORPORATION, Kanagawa (JP)

(72) Inventors: Luonghung Asakura, Kanagawa (JP); Chihiro Okada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/280,042

(22) PCT Filed: Sep. 17, 2019

(86) PCT No.: PCT/JP2019/036326
§ 371 (c)(1),
(2) Date: Mar. 25, 2021

(87) PCT Pub. No.: WO2020/071104
PCT Pub. Date: Apr. 9, 2020

(65) Prior Publication Data
US 2022/0060643 A1    Feb. 24, 2022

(30) Foreign Application Priority Data

Oct. 5, 2018    (JP) ................ JP2018-189829

(51) Int. Cl.
*H04N 5/359*    (2011.01)
*H04N 5/343*    (2011.01)
*H04N 5/357*    (2011.01)

(52) U.S. Cl.
CPC ............. *H04N 5/359* (2013.01); *H04N 5/343* (2013.01); *H04N 5/357* (2013.01)

(58) Field of Classification Search
CPC ...... H04N 5/343; H04N 5/3452; H04N 5/351; H04N 5/3532; H04N 5/357; H04N 5/359
See application file for complete search history.

(56) References Cited

U.S. PATENT DOCUMENTS

2016/0227136 A1*   8/2016   Moon .................. H04N 5/3456

FOREIGN PATENT DOCUMENTS

JP    10-13731 A    1/1998
JP    2004-80690 A    3/2004
(Continued)

OTHER PUBLICATIONS

International Search Report and Written Opinion of PCT Application No. PCT/JP2019/036326, dated Dec. 3, 2019, 08 pages of ISRWO.

*Primary Examiner* — Daniel M Pasiewicz
(74) *Attorney, Agent, or Firm* — Chip Law Group

(57) ABSTRACT

In a pixel array unit 11, pixels that generate pixel signals are arranged in a matrix. A control unit 17 performs reading of pixel signals in a first mode in which reading of the pixel signals is performed by thinning out lines from the pixel array unit 11, and reading of pixel signals in a second mode in which reading of the pixel signals is performed by including the lines thinned out in the first mode after the reading in the first mode. A signal processing unit 16 uses a pixel signal read in the first mode and a pixel signal read in the second mode, to set an amount of correction for a pixel of the lines thinned out in the first mode, on the basis of the pixel signal read in the second mode from a pixel in which reading of the pixel signal is performed in the first mode and the second mode, and corrects the pixel signal read in the second mode from the pixel of the lines thinned out in the first mode with the set amount of correction to reduce an influence of leakage light.

9 Claims, 17 Drawing Sheets

(56) References Cited

FOREIGN PATENT DOCUMENTS

| JP | 2014-175934 A | 9/2014 |
|---|---|---|
| JP | 2015-33067 A | 2/2015 |

\* cited by examiner

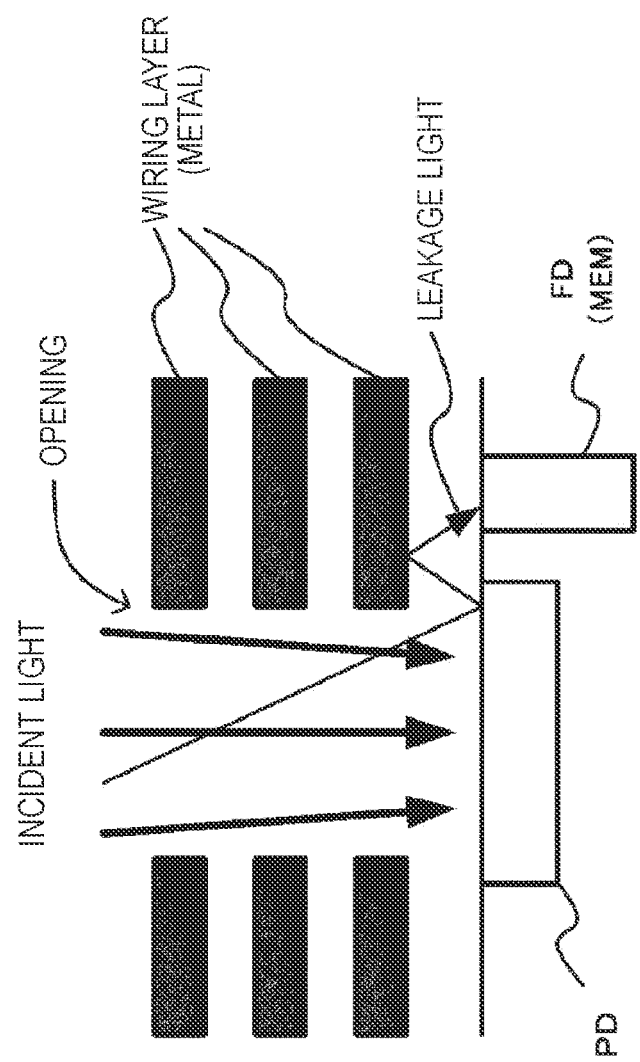

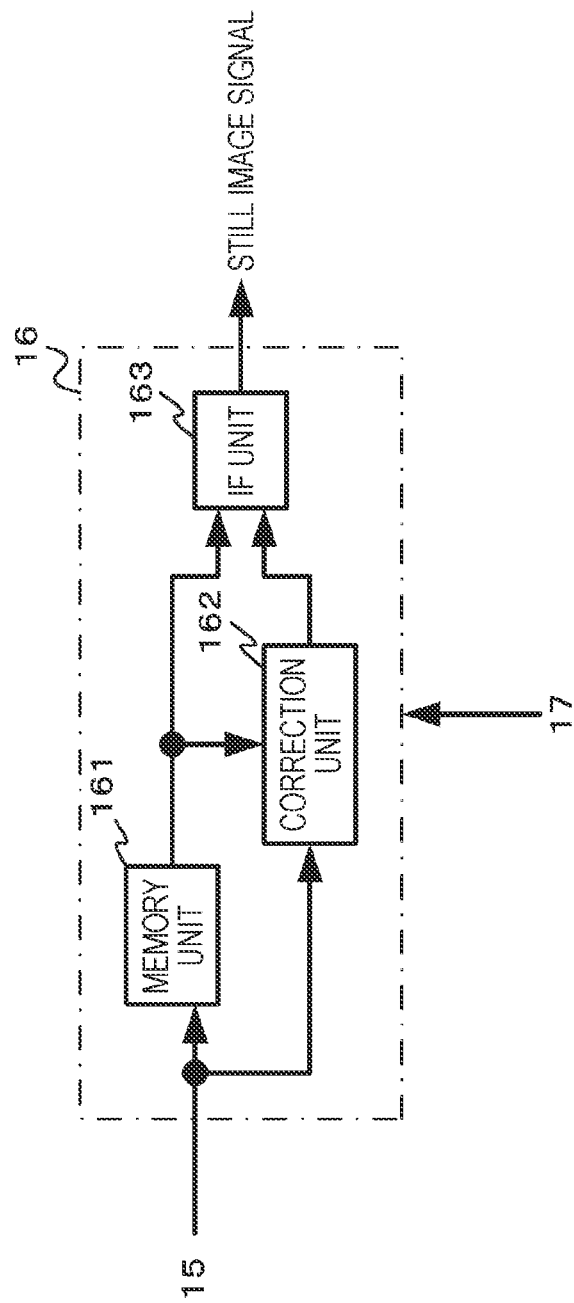

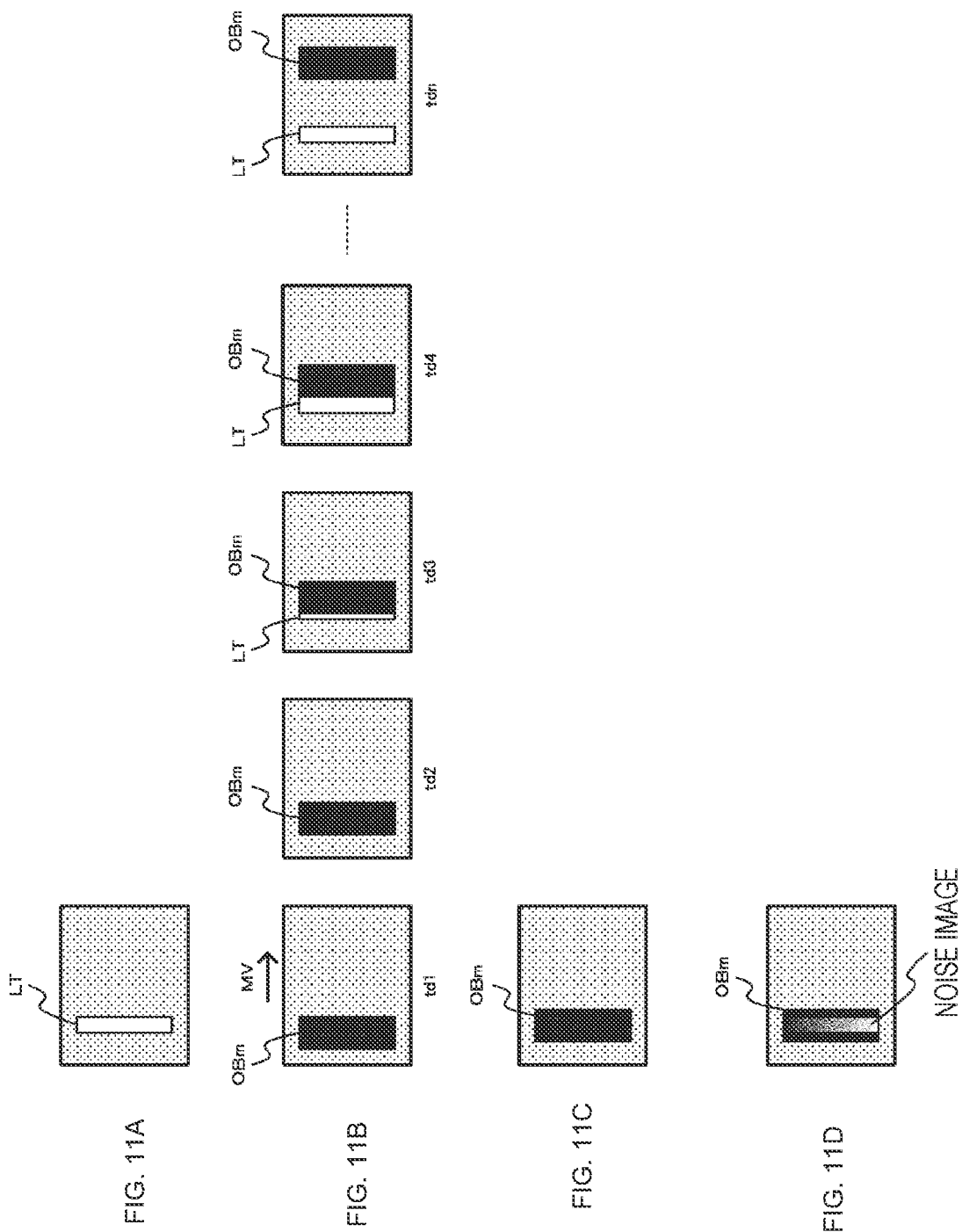

SOLID-STATE IMAGING DEVICE, DRIVING METHOD, AND ELECTRONIC DEVICE

CROSS REFERENCE TO RELATED APPLICATIONS

This application is a U.S. National Phase of International Patent Application No. PCT/JP2019/036326 filed on Sep. 17, 2019, which claims priority benefit of Japanese Patent Application No. JP 2018-189829 filed in the Japan Patent Office on Oct. 5, 2018. Each of the above-referenced applications is hereby incorporated herein by reference in its entirety.

TECHNICAL FIELD

This technology relates to a solid-state imaging device, a driving method, and an electronic device, and performs correction for an influence by leakage light.

BACKGROUND ART

In a CMOS type solid-state imaging device, a global shutter function has conventionally been implemented in which a charge holding unit is arranged in a pixel unit and storage periods of all pixels are set to the same time. Furthermore, although the charge holding unit has a structure in which it is difficult for light to enter due to a light shielding member, it is difficult to completely block entering of light, and leakage light may enter the charge holding unit. Then, when the charge holding unit receives the leakage light, generation of electric charge occurs inside the charge holding unit. The electric charge is a noise charge for a signal charge generated and stored by a light receiving element (photoelectric conversion unit) during the storage period. The noise charge varies depending on a time during which the leakage light enters the charge holding unit and an intensity of the light, and is a cause of degradation of image quality. For this reason, in Patent Document 1, pixels of half of the total number of pixels are set as effective pixels, and the other half of the pixels are set as reference pixels that are references for correction, and a noise component is removed by subtracting, from an output of an effective pixel including an effective signal component and a noise component due to the leakage light, a noise component due to the leakage light that is an output of a nearby reference pixel.

CITATION LIST

Patent Document

Patent Document 1: Japanese Patent Application Laid-Open No. 2014-175934

SUMMARY OF THE INVENTION

Problems to be Solved by the Invention

By the way, as in Patent Document 1, in a case where the pixels of half of the total number of pixels are set as the effective pixels and the other half are set as the reference pixels, the reference pixels are not used as pixels for generating the effective signal components, so that a decrease is caused in spatial resolution and sensitivity.

Thus, it is an object of this technology to provide a solid-state imaging device, a driving method, and an electronic device capable of performing correction for the influence of the leakage light without decreasing the spatial resolution and the like.

Solutions to Problems

A first aspect of this technology is in
a solid-state imaging device including
a signal processing unit that uses pixel signals read in a first mode in which reading of the pixel signals is performed by thinning out lines from a pixel array unit in which pixels that generate pixel signals are arranged in a matrix, and pixel signals read in a second mode in which reading of the pixel signals is performed by including the lines thinned out in the first mode after the reading in the first mode, to perform correction processing on the pixel signals read in the second mode.

In this technology, the signal processing unit uses the pixel signals read in the first mode (line thinning-out mode) in which the reading of the pixel signals is performed by thinning out the lines from the pixel array unit in which the pixels that generate the pixel signals are arranged in a matrix, and the pixel signals read in the second mode, for example, line non-thinning-out in which the reading of the pixel signals is performed by including the lines thinned out in the line thinning-out mode subsequently to the reading in, for example, the line thinning-out mode, after the reading in the line thinning-out mode. The signal processing unit sets an amount of correction for a pixel of the lines thinned out in the line thinning-out mode, on the basis of a pixel signal read in a line non-thinning-out mode from a pixel in which reading of the pixel signal is performed in the line thinning-out mode and the line non-thinning-out mode. For example, the signal processing unit sets an amount of correction for a correction target pixel in the lines thinned out in the line thinning-out mode, on the basis of a pixel signal read in the second mode of a pixel that is close to the correction target pixel and in which reading of the pixel signal is performed in the line thinning-out mode and the second mode, and corrects the pixel signal of the correction target pixel by using the set amount of correction.

In a case where the pixels of the pixel array unit include pixels of respective color components, the signal processing unit performs correction processing on the pixel signals for each color component. Furthermore, the signal processing unit may set an amount of correction on the basis of pixel signals read in the line thinning-out mode and the line non-thinning-out mode, and a time until reading is performed in the line thinning-out mode and a time from when the reading is performed in the line thinning-out mode until reading is performed in the line non-thinning-out mode, for each pixel in which reading of the pixel signals is performed in the line thinning-out mode and the line non-thinning-out mode. Furthermore, a line thinning-out rate in the line thinning-out mode may be adjusted depending on an exposure time of the pixels.

Moreover, lines from which the pixel signals are read in the line thinning-out mode may include lines constituting a moving image and lines not used for the moving image, and lines from which the pixel signals are read in the second mode may be lines in which the lines constituting the moving image are excluded, and the reading of the pixel signals in the line thinning-out mode may be performed for each frame of the moving image. In this case, the signal processing unit outputs pixel signals of the lines of the moving image in the lines read in the line thinning-out mode as a moving image signal, performs correction processing on the pixel signals read in the second mode on the basis of the pixel signals read in the line thinning-out mode and the second mode, and outputs pixel signals after the correction processing as a still image signal.

A second aspect of this technology is in a driving method for a solid-state imaging device, including using pixel signals read in a first mode in which reading of the pixel signals is performed by thinning out lines from a pixel array unit in which pixels that generate pixel signals are arranged in a matrix, and pixel signals read in a second mode in which reading of the pixel signals is performed by including the lines thinned out in the first mode after the reading in the first mode, to perform correction processing on the pixel signals read in the second mode, by a signal processing unit.

A third aspect of this technology is in an electronic device including a solid-state imaging device including a signal processing unit that uses pixel signals read in a first mode in which reading of the pixel signals is performed by thinning out lines from a pixel array unit in which pixels that generate pixel signals are arranged in a matrix, and pixel signals read in a second mode in which reading of the pixel signals is performed by including the lines thinned out in the first mode after the reading in the first mode, to perform correction processing on the pixel signals read in the second mode.

BRIEF DESCRIPTION OF DRAWINGS

FIG. 6 is a diagram for explaining an influence by leakage light.

FIG. 7 is a diagram exemplifying a configuration of a signal processing unit in a first embodiment.

FIGS. 11A, 11B, 11C, and 11D are diagrams illustrating an operation example of the first embodiment.

MODE FOR CARRYING OUT THE INVENTION

Figure 1:
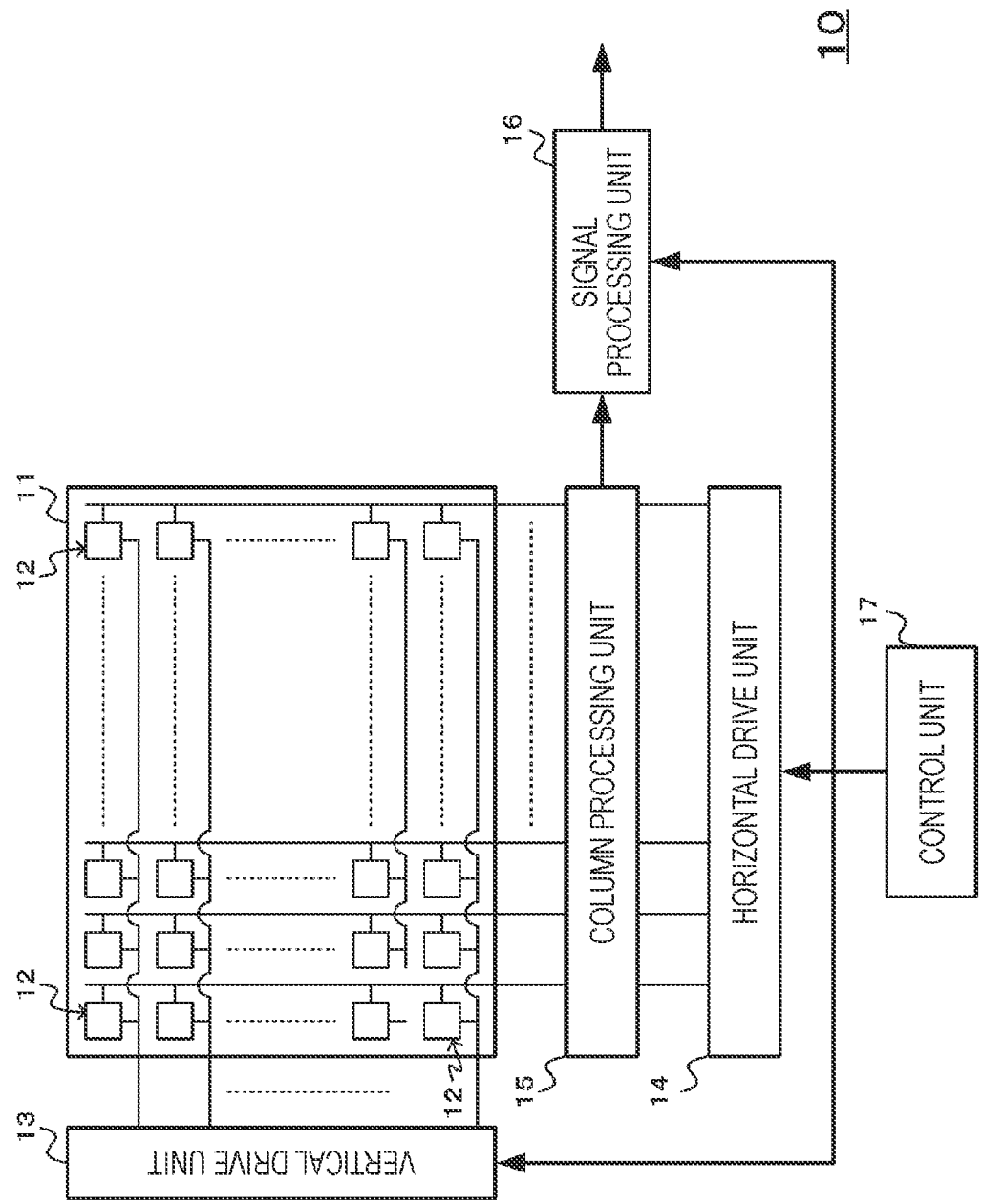
FIG. 1 is a diagram for explaining a configuration of a solid-state imaging device.

The following is a description of embodiments for carrying out the present technology. Note that, the description will be made in the following order.
1. Configuration of solid-state imaging device
2. First Embodiment
3. Second Embodiment
4. Configuration of electronic device
5. Usage examples of image sensor 1. Configuration of Solid-State Imaging Device FIG. 1 is a diagram for explaining a configuration of a solid-state imaging device to which the present disclosure is applied. A solid-state imaging device 10 includes a pixel array unit 11, a vertical drive unit 13, a horizontal drive unit 14, a column processing unit 15, a signal processing unit 16, and a control unit 17.

Light focused by an optical system (not illustrated) is incident on the pixel array unit 11. In the pixel array unit 11, pixels 12 are arranged in a matrix. Each pixel 12 is connected to the vertical drive unit 13 via a control line for each row, and is connected to the column processing unit 15 via a signal line for each column.

The pixel 12 includes a photoelectric conversion unit including a photodiode or the like, a floating diffusion region to which electric charge from the photoelectric conversion unit is transferred, and a transistor for driving the pixel, and generates a pixel signal of a level depending on an amount of received light. Note that, a configuration of the pixel 12 will be described later.

The vertical drive unit 13 generates a drive signal for sequentially driving the pixels 12 of the pixel array unit 11 for each row and outputs the drive signal to the pixel array unit 11. Furthermore, in the pixel array unit 11, the signal line is formed corresponding to each of pixel columns, and the pixel signal generated by the pixel 12 is output to the column processing unit 15 via the signal line.

The horizontal drive unit 14 includes logic circuits such as a shift register and an address decoder. The horizontal drive unit 14 generates a drive signal for sequentially outputting the pixel signal to the signal processing unit 16 for each of the multiple pixel columns arranged in the pixel array unit 11 and outputs the drive signal to the column processing unit 15.

On the basis of the drive signal from the horizontal drive unit 14, the column processing unit 15 performs double data sampling (DDS) processing, and A/D conversion processing of the signal after the DDS processing on the signal output from the pixel 12. For example, the column processing unit 15 performs the DDS processing in parallel for each pixel column, converts the signal after the DDS processing from an analog signal to a digital signal, and outputs the signal to the signal processing unit 16.

On the basis of a control signal from the control unit 17, the signal processing unit 16 performs correction processing of performing correction for an influence by leakage light, on the pixel signal supplied from the column processing unit 15. The signal processing unit 16 uses pixel signals read in a first mode (hereinafter referred to as "line thinning-out mode") in which reading of the pixel signals is performed by thinning out lines, and pixel signals read in a second mode in which reading of the pixel signals is performed by including the lines thinned out in the line thinning-out mode subsequently to the reading in, for example, the line thinning-out mode, after the reading in the first mode, to perform the correction processing on the pixel signals read in the second mode, and outputs an image signal after the correction processing.

The control unit 17 generates the control signal to control operations of the vertical drive unit 13 and the horizontal drive unit 14, and performs reading of the pixel signals from the pixel array unit 11 on a line basis. Furthermore, the control unit 17 performs reading of the pixel signals read in the first mode, and the pixels signal in the second mode after reading in the line thinning-out mode. Furthermore, the control unit 17 controls operation of the signal processing unit 16 to cause the correction processing on the pixel signals read in the second mode to be performed on the basis of the pixel signals read in the line thinning-out mode and the pixel signals read in the second mode, and causes the image signals in which correction is performed for the influence of the leakage light to be output from the signal processing unit 16.

Note that, the signal processing unit 16 and the control unit 17 may be formed integrally with a semiconductor substrate on which the pixel array unit 11 is formed, or provided separately from the semiconductor substrate, for example. Moreover, the signal processing unit 16 and the control unit 17 may be processes by a digital signal processor (DSP) or software.

Figure 2:
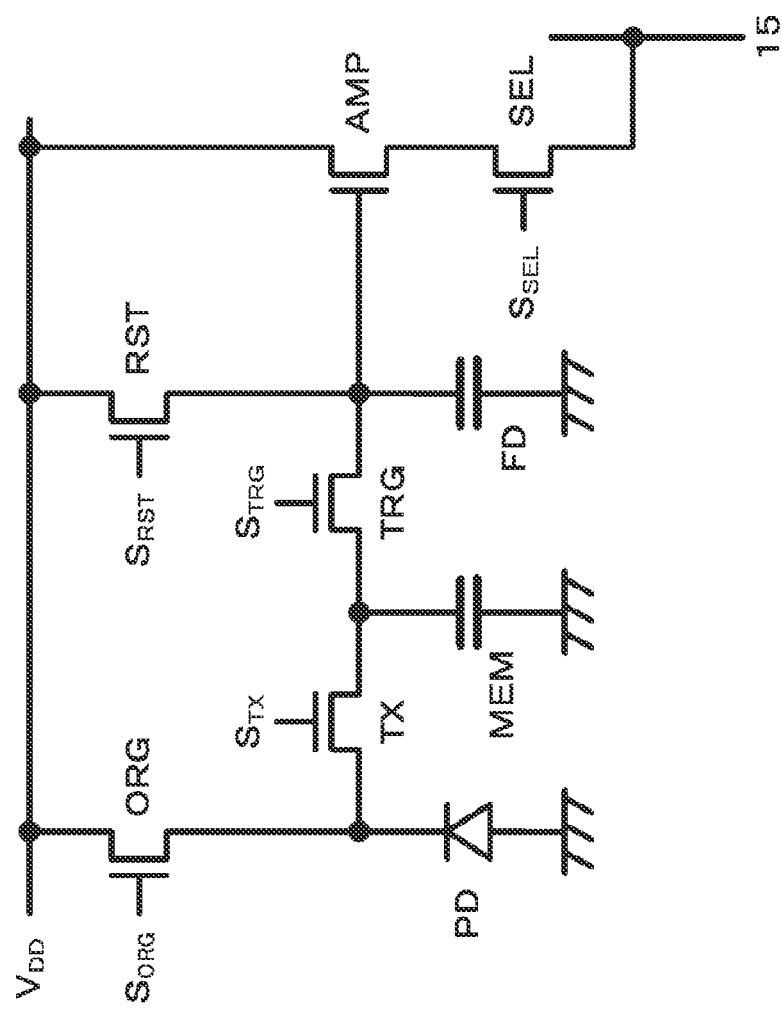
FIG. 2 is a diagram exemplifying a first configuration of a pixel.

FIG. 2 exemplifies a first configuration of the pixel. Note that, the pixel illustrated in FIG. 2 exemplify a memory storage type pixel.

The pixel 12 includes an initialization transistor ORG, transfer transistors TX and TRG, a reset transistor RST, an amplification transistor AMP, a selection transistor SEL, a photoelectric conversion unit PD, a memory unit MEM, and a floating diffusion region FD.

The initialization transistor ORG is a transistor for applying a predetermined voltage to the photoelectric conversion unit PD. The transfer transistor TX is a transistor for transferring electric charge generated by the photoelectric conversion unit PD to the memory unit MEM. The transfer transistor TRG is a transistor for transferring the electric charge of the memory unit MEM to the floating diffusion region FD. The reset transistor RST is a transistor for applying the predetermined voltage to the floating diffusion region FD. The amplification transistor AMP is a transistor in which the voltage of the floating diffusion region FD is applied to the gate electrode. The selection transistor SEL is a transistor for connecting the amplification transistor AMP to the signal line.

The photoelectric conversion unit PD includes a photodiode, and generates electric charge depending on incident light by photoelectric conversion. The memory unit MEM stores the electric charge generated by the photoelectric conversion unit PD. Furthermore, the floating diffusion region FD is provided to convert the electric charge into a voltage.

A constant voltage (for example, ground voltage) is supplied to one end (anode side) of the photoelectric conversion unit PD, one end of the memory unit MEM, and one end of the floating diffusion region FD. A power supply line to which a drive voltage is supplied and the other end (cathode side) of the photoelectric conversion unit PD are connected together via the initialization transistor ORG. The power supply line to which the drive voltage is supplied and the other end of the floating diffusion region FD are connected together via the reset transistor RST. The other end of the photoelectric conversion unit PD and the other end of the memory unit MEM are connected together via the transfer transistor TX. Furthermore, the other end of the memory unit MEM and the other end of the floating diffusion region FD are connected together via the transfer transistor TRG.

In the photoelectric conversion unit PD, the anode electrode is connected to the low potential side, and the received light (incident light) is converted into electric charge depending on the amount of light and the electric charge is stored. A node electrically connected to the gate electrode of the amplification transistor AMP is the floating diffusion region FD.

One end of the amplification transistor AMP is connected to the power supply line to which the drive voltage is supplied. The other end of the amplification transistor AMP and the signal line are connected together via the selection transistor SEL. The gate electrode of the amplification transistor AMP is connected to the other end of the floating diffusion region FD.

Figure 3:
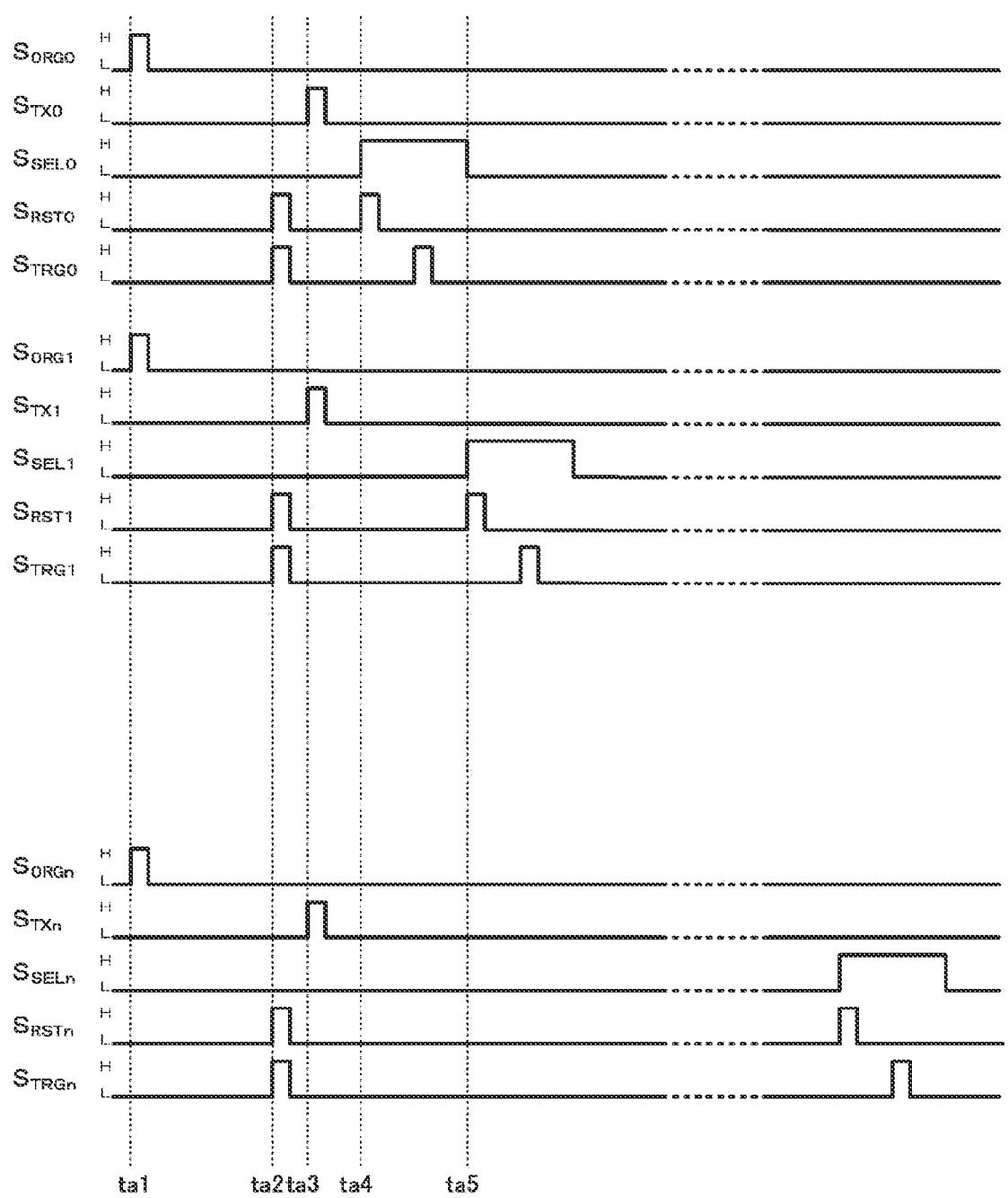
FIG. 3 is a timing chart for explaining operation of pixels of the first configuration.

FIG. 3 is a timing chart for explaining operation of pixels of the first configuration. Note that, in the initial 0th line, a drive signal for the initialization transistor ORG is a drive signal SORG0, a drive signal for the transfer transistor TX is a drive signal STX0, a drive signal for the transfer transistor TRG is a drive signal STRG0, a drive signal for the reset transistor RST is a signal SRST0, and a drive signal for the selection transistor SEL is a drive signal SSEL0. Furthermore, in the first line, the drive signal for the initialization transistor ORG is a drive signal SORG1, the drive signal for the transfer transistor TX is a drive signal STX1, the drive signal for the transfer transistor TRG is a drive signal STRG1, the drive signal for the reset transistor RST is a drive signal SRST1, and the drive signal for the selection transistor SEL is a drive signal SSEL1. Similarly, in the last nth line, the drive signal for the initialization transistor ORG is a drive signal SORGn, the drive signal for the transfer transistor TX is a drive signal STXn, the drive signal for the transfer transistor TRG is a drive signal STRGn, the drive signal for the reset transistor RST is a drive signal SRSTn, and the drive signal for the selection transistor SEL is a drive signal SSELn.

At a time point ta1, when the drive signals SORG0 to SORGn of all lines are set to a high level for a certain period and then set to a low level, a voltage VDD is applied via the initialization transistor ORG, the photoelectric conversion unit PD is reset, and then exposure is started. Note that, this operation is also referred to as global reset.

At a time point ta2, the drive signals SRST0 to SRSTn and the drive signals STRG0 to STRGn of all lines are set to the high level for a certain period, and the memory unit MEM and the floating diffusion region FD are reset.

When the drive signals STX0 to STXn of all lines are set to the high level for a predetermined period at a time point ta3 when a predetermined exposure period has elapsed, the transfer transistor TX of each line is in a conductive state, and the electric charge generated by the photoelectric conversion is transferred to the memory unit MEM and held. Note that, this operation is also referred to as global transfer.

Thereafter, reading of the pixel signal is performed for each line. Hereinafter, a description will be given of operation in a case where the pixel signal is read in line order. For example, the drive signal SSEL0 of the 0th line to be a read target at a time point ta4 is set to the high level for a predetermined period. As a result, the amplification transistor AMP of the 0th line is connected to the signal line via the selection transistor SEL in the conductive state. Then, within that period, the drive signal SRST0 of the 0th line is set to the high level for a certain period, and then the drive signal STRG0 is set to the high level for a certain period while the drive signal SRST0 is at the low level. By this operation, reading of a reset level and a signal level is performed, and the column processing unit 15 sets a signal indicating a difference between the reset level and the signal level as a pixel signal of the 0th line.

Similarly, the drive signal SSEL1 of the first line to be a read target at a time point ta5 is set to the high level for a predetermined period. As a result, the amplification transistor AMP of the first line is connected to the signal line via the selection transistor SEL in the conductive state. Then, within that period, the drive signal SRST1 of the first line is set to the high level for a certain period, and then the drive signal STRG1 is set to the high level for a certain period while the drive signal SRST1 is at the low level. By this operation, reading of the reset level and a signal level is performed, and the column processing unit 15 sets a signal indicating a difference between the reset level and the signal level as a pixel signal of the first line.

After that, similarly, a line is sequentially selected by the drive signal SSEL, and the reset transistor RST and the transfer transistor TRG of the selected line are driven, whereby a signal of the selected line can be read. Furthermore, in a case where line thinning-out is performed, if a line in which reading of a signal is performed is selected by the drive signal SSEL, the reading of the signal can be performed only for a desired line.

Figure 4:
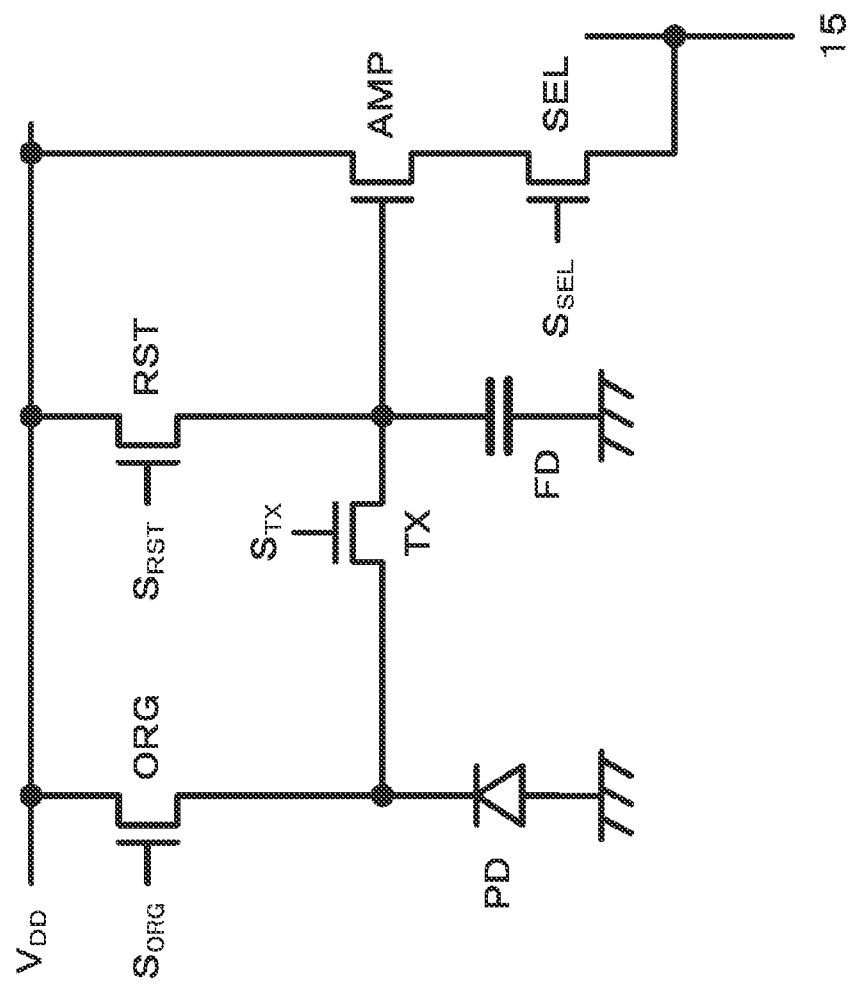
FIG. 4 is a diagram exemplifying a second configuration of the pixel.

FIG. 4 exemplifies a second configuration of the pixel. Note that, the pixel illustrated in FIG. 4 exemplify an FD storage type pixel.

The pixel 12 includes the initialization transistor ORG, the transfer transistor TX, the reset transistor RST, the amplification transistor AMP, the selection transistor SEL, the photoelectric conversion unit PD, and the floating diffusion region FD.

The initialization transistor ORG is a transistor for applying a predetermined voltage to the photoelectric conversion unit PD. The transfer transistor TX is a transistor for transferring the electric charge generated by the photoelectric conversion unit PD to the floating diffusion region FD. The reset transistor RST is a transistor for applying the predetermined voltage to the floating diffusion region FD. The amplification transistor AMP is a transistor in which the voltage of the floating diffusion region FD is applied to the gate electrode. The selection transistor SEL is a transistor for connecting the amplification transistor AMP to the signal line.

The photoelectric conversion unit PD includes a photodiode, and generates electric charge depending on incident light by photoelectric conversion. Furthermore, the floating diffusion region FD is provided to convert the electric charge into a voltage with a capacitance parasitically existing in the floating diffusion region FD.

A constant voltage (for example, ground voltage) is supplied to one end (anode side) of the photoelectric conversion unit PD, and one end of the floating diffusion region FD. A power supply line to which a drive voltage is supplied and the other end (cathode side) of the photoelectric conversion unit PD are connected together via the initialization transistor ORG. The power supply line to which the drive voltage is supplied and the other end of the floating diffusion region FD are connected together via the reset transistor RST. The other end of the photoelectric conversion unit PD and the other end of the floating diffusion region FD are connected together via the transfer transistor TX.

In the photoelectric conversion unit PD, the anode electrode is connected to the low potential side, and the received light (incident light) is converted into electric charge depending on the amount of light and the electric charge is stored. A node electrically connected to the gate electrode of the amplification transistor AMP is the floating diffusion region FD, and the electric charge stored in the photoelectric conversion unit PD is transferred to the floating diffusion region FD via the transfer transistor TX.

One end of the amplification transistor AMP is connected to the power supply line to which the drive voltage is supplied. The other end of the amplification transistor AMP and the signal line are connected together via the selection transistor SEL. The gate electrode of the amplification transistor AMP is connected to the other end of the floating diffusion region FD.

Figure 5:
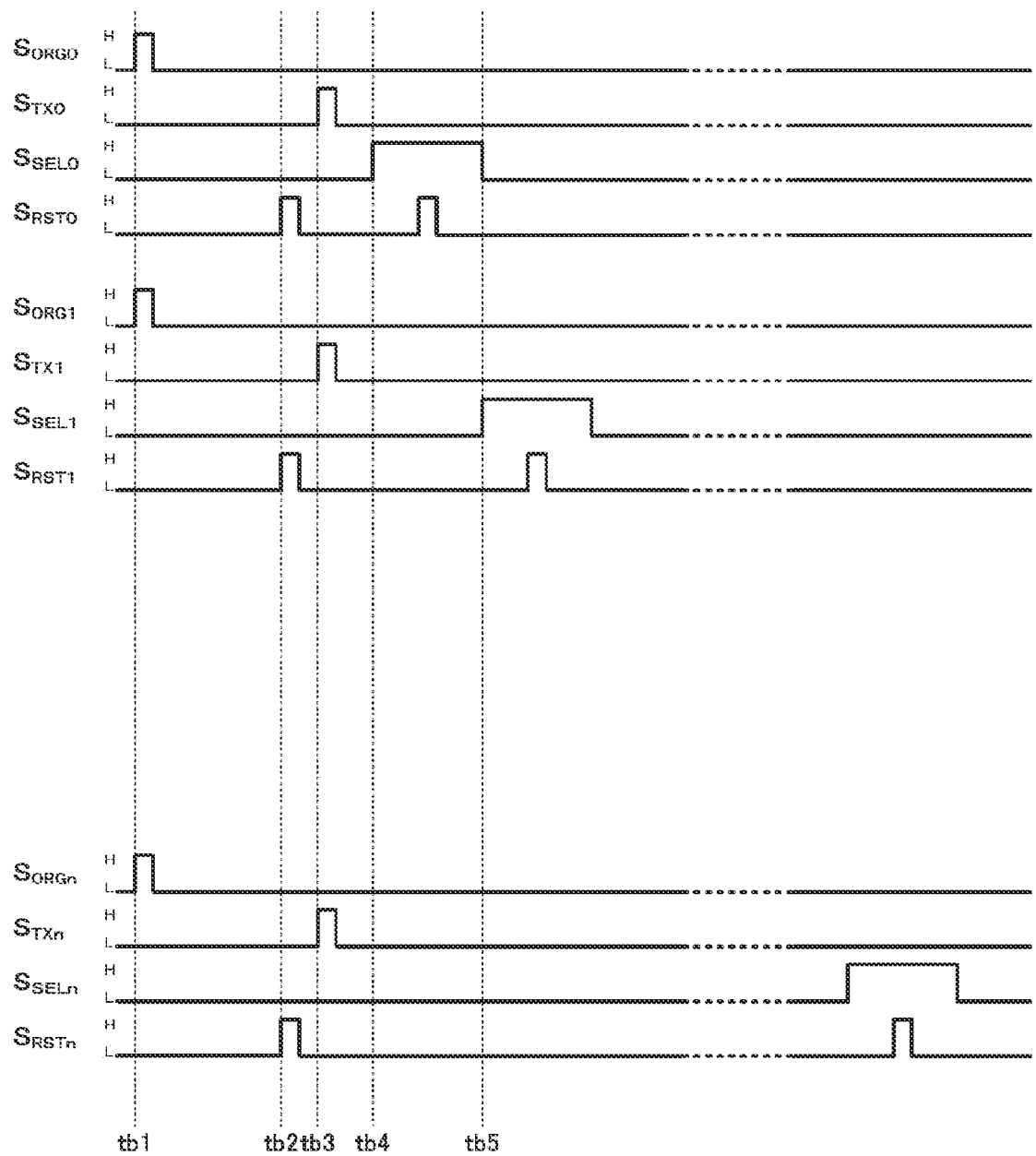
FIG. 5 is a timing chart for explaining operation of pixels of the second configuration.

FIG. 5 is a timing chart for explaining operation of pixels of the second configuration. Note that, in the initial 0th line, the drive signal for the initialization transistor ORG is the drive signal SORG0, the drive signal for the transfer transistor TX is the drive signal STX0, the drive signal for the reset transistor RST is the drive signal SRST0, and the drive signal for the selection transistor SEL is the signal SSEL0. Furthermore, in the first line, the drive signal for the initialization transistor ORG is the drive signal SORG1, the drive signal for the transfer transistor TX is the drive signal STX1, the drive signal for the reset transistor RST is the drive signal SRST1, and the drive signal for the selection transistor SEL is the drive signal SSEL1. Similarly, in the last nth line, the drive signal for the initialization transistor ORG is the drive signal SORGn, the drive signal for the transfer transistor TX is the drive signal STXn, the drive signal for the reset transistor RST is the drive signal SRSTn, and the drive signal for the selection transistor SEL is the drive signal is SSELn.

At a time point tb1, when the drive signals SORG0 to SORGn of all lines are set to the high level for a certain period and then set to the low level, the voltage VDD is applied via the initialization transistor ORG, the photoelectric conversion unit PD is reset, and then exposure is started. Note that, this operation is also referred to as global reset.

Thereafter, at a time point tb2, the drive signals SRST0 to SRSTn of all lines are set to the high level for a certain period, and the floating diffusion region FD is reset.

When the drive signals STX0 to STXn of all lines are set to the high level for a predetermined period at a time point tb3 when a predetermined exposure period has elapsed, the transfer transistor TX of each line is in the conductive state, and the electric charge generated by the photoelectric conversion is transferred to the floating diffusion region FD and held. Note that, this operation is also referred to as global transfer.

Thereafter, reading of the pixel signal of each line is performed. Specifically, the drive signal SSEL0 of the 0th line to be a read target at a time point tb4 is set to the high level for a predetermined period. As a result, the amplification transistor AMP of the 0th line is connected to the signal line via the selection transistor SEL in the conductive state, and reading is performed of a signal level depending on the electric charge stored in the floating diffusion region FD. Thereafter, within a period during which the drive signal SSEL0 is in the high level, a signal read after the drive signal SRST0 of the 0th line is set to the high level for a certain period has the reset level. The column processing unit 15 sets a signal indicating a difference between the signal level and the reset level depending on the electric charge stored in the floating diffusion region FD as a pixel signal of the 0th line.

Similarly, the drive signal SSEL1 of the first line to be read target at a time point tb5 is set to the high level for a predetermined period. As a result, the amplification transistor AMP of the first line is connected to the signal line via the selection transistor SEL in the conductive state, and reading is performed of a signal level depending on the electric charge stored in the floating diffusion region FD. Thereafter, within a period during which the drive signal SSEL0 is in the high level, a signal read after the drive signal SRST1 of the 0th line is set to the high level for a certain period has the reset level. The column processing unit 15 sets a signal indicating a difference between the signal level and the reset level depending on the electric charge stored in the floating diffusion region FD as a pixel signal of the first line.

After that, similarly, a line is sequentially selected by the drive signal SSEL, and the reset transistor RST of the selected line is driven, whereby a signal of the selected line can be read. Furthermore, in a case where line thinning-out is performed, if a line in which reading of a signal is performed is selected by the drive signal SSEL, the reading of the signal can be performed only for a desired line.

By driving each pixel in this way, it becomes possible to implement the simultaneity of exposure operations even if a mechanical shutter is not provided, and it becomes possible to generate an image signal indicating a captured image without focal plane distortion.

Note that, the pixel illustrated in FIG. 1 is not limited to the configuration illustrated in FIG. 2 or 4. Furthermore, the reading of the signal is not limited to the operation of driving the transistor as illustrated in FIG. 3 or 5.

As described above, in a case where the image signal is generated without provision of the mechanical shutter, the influence by the leakage light may occur in a signal component depending on subject light. FIG. 6 is a diagram for explaining the influence by the leakage light. At a position of the photoelectric conversion unit PD in the pixel 12, an opening is provided so that the subject light is incident on the photoelectric conversion unit PD, and in a region other than the opening, a wiring layer, an insulating layer, and the like are laminated. The electric charge generated by each photoelectric conversion unit PD during the exposure period is transferred to the memory unit MEM or the floating diffusion region FD by global transfer. Furthermore, the pixel signal depending on the electric charge transferred to the memory unit MEM or the floating diffusion region FD is read at a timing of each line. In a case where the mechanical shutter is not provided, light continues to be incident on the opening, so when the incident light is reflected by the wiring layer and the like, and electric charge generated by the reflected light is stored in the floating diffusion region FD (or memory unit MEM), a noise component generated depending on the leakage light from the global transfer to the reading of the signal is superimposed on the signal component depending on the subject light.

2. First Embodiment

In a first embodiment, a case will be described where a still image on which correction for an influence of leakage light is performed is acquired without decreasing the spatial resolution and the like.

In the first embodiment, from the pixel array unit 11, reading of pixel signals is performed in the line thinning-out mode, and reading of pixel signals is performed in the second mode in which reading of the pixel signals is performed by including lines thinned out in the line thinning-out mode subsequently to the reading in the line thinning-out mode, for example, in the line non-thinning-out mode in which reading of the pixel signals is performed without thinning out the lines.

The signal processing unit 16 sets an amount of correction for a correction target pixel in a line thinned out in the line thinning-out mode, on the basis of a signal difference for each pixel at the same position of a line in which reading of pixel signals is performed in the line thinning-out mode and the line non-thinning-out mode, and corrects a pixel signal of the correction target pixel on the basis of the set amount of correction, thereby generating a still image signal in which the correction for the influence of the leakage light is performed.

FIG. 7 illustrates a configuration of the signal processing unit in the first embodiment. The signal processing unit 16 includes a memory unit 161, a correction unit 162, and an interface (IF) unit 163.

A pixel signal supplied from the column processing unit 15 is supplied to the memory unit 161 and the correction unit 162. The memory unit 161 stores the pixel signal supplied from the column processing unit 15. Furthermore, the memory unit 161 outputs the stored pixel signal to the correction unit 162 and the interface unit 163.

The correction unit 162 sets an amount of correction for a pixel of the line thinned out in the line thinning-out mode, on the basis of a pixel signal read in the line non-thinning-out mode supplied from the column processing unit 15 and a pixel signal read in the line thinning-out mode stored in the memory unit 161, and corrects a signal of the pixel on the basis of the set amount of correction. The correction unit 162 outputs a corrected pixel signal to the interface unit 163.

The interface unit 163 selects pixel signals stored in the memory unit 161 and pixel signals on which the correction processing is performed by the correction unit 162 in line order and outputs them as the still image signal.

Figure 8A:
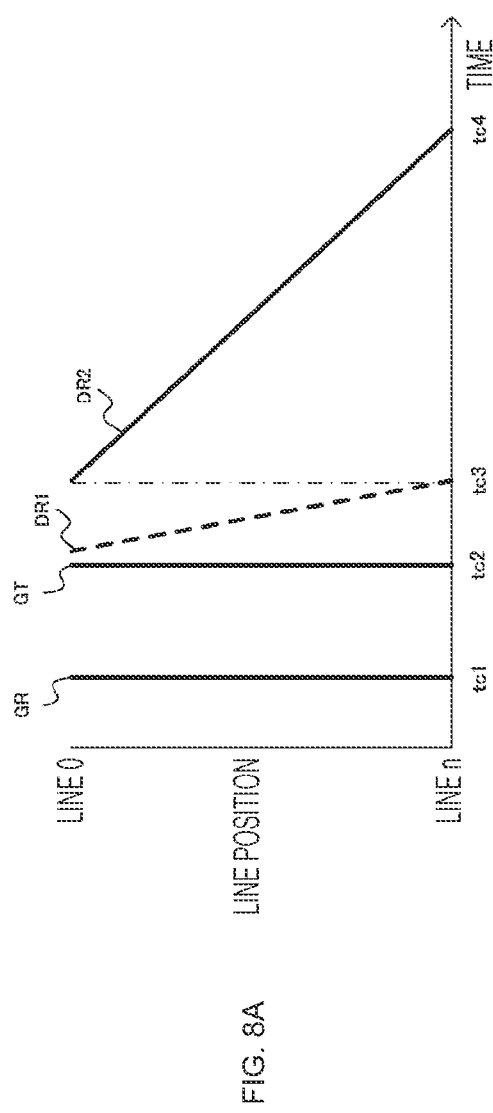
FIGS. 8A, 8B, and 8C are diagrams for explaining operation of the first embodiment.
Figure 8C:
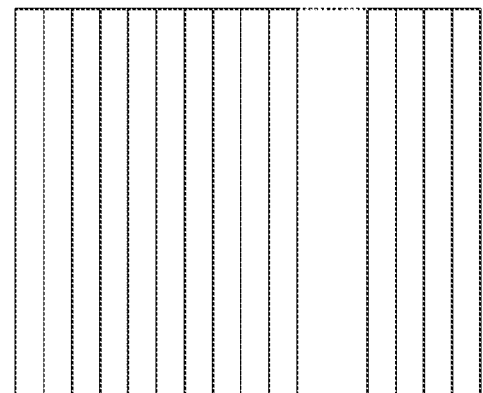
Figure 8B:
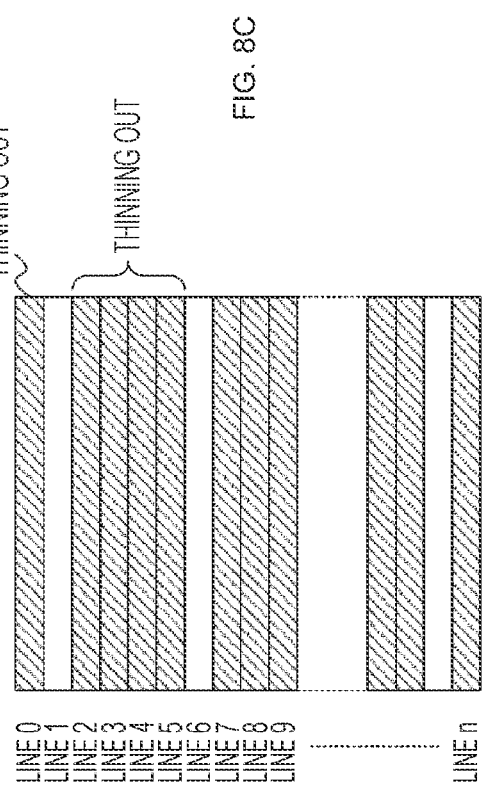

FIGS. 8A, 8B, and 8C are diagrams for explaining operation of the first embodiment. In FIG. 8A, reading of pixel signals is illustrated. The control unit 17 performs global reset GR at a time point tc1, performs global transfer GT at a time point tc2 when an exposure time has elapsed, and then starts reading DR1 of image signals in the line thinning-out mode. When the reading DR1 of the image signals in the line thinning-out mode ends at the time point tc3, the control unit 17 subsequently performs reading DR2 of pixel signals in the line non-thinning-out mode, and the reading DR2 of the image signals in the line non-thinning-out mode ends at a time point tc4.

In FIG. 8B, lines are exemplified from which pixel signals are read in the line thinning-out mode. The control unit 17 performs line thinning-out, and performs reading of the pixel signals at predetermined line intervals on a line basis. For example, in FIG. 8B, an interval of lines from which the pixel signals are read is set to a five-line interval, and thinning out is performed for four lines indicated by oblique lines.

In FIG. 8C, lines are exemplified from which pixel signals are read in the line non-thinning-out mode. The control unit 17 performs reading of the pixel signals on a line basis without performing line thinning-out. Thus, for example, for the lines 1, 6, . . . , reading of the pixel signals is performed in the line thinning-out mode and the line non-thinning-out mode.

As indicated in the equation (1), a pixel signal PV1 read in the line thinning-out mode is a signal obtained by adding, to an effective signal Va depending on the subject light, a noise component Vpls1 generated by leakage light during a period from the global transfer until the reading is performed in the line thinning-out mode.

$$PV1 = Va + Vpls1 \quad (1)$$

In a case where the pixel signals are read in the line thinning-out mode, a time from the global transfer until the reading of the pixel signals is performed is a shorter time than in the case of the line non-thinning-out mode. Thus, the noise component Vpls1 in the pixel signal read in the line thinning-out mode can be reduced as compared with the case of the line non-thinning-out mode. Furthermore, if the number of lines to be thinned out is increased, the noise component Vpls1 can be further reduced.

The signal processing unit 16 stores the pixel signal with the less noise component Vpls1 read in the line thinning-out mode in the memory unit 161.

Next, in reading of pixel signals in the line non-thinning-out mode, reading of the effective signal Va is performed in a line in which the pixel signal is read in the line thinning-out mode, so that a pixel signal PV2w of the line is a signal indicating a noise component Vpls2 generated by leakage light during a period from when the pixel signal is read in the line thinning-out mode until the pixel signal is read in the line non-thinning-out mode, as indicated in the equation (2).

$$PV2w = Vpls2 \quad (2)$$

Furthermore, in reading of pixel signals in the line non-thinning-out mode, a pixel signal PV2s of a line in which reading of pixel signals is thinned out in the line thinning-out mode is a signal obtained by adding, to the effective signal Va depending on the subject light, the noise component Vpls1 generated by leakage light during a period from the global transfer to a timing of the line in the line thinning-out mode, and the noise component Vpls2 generated by leakage light during a period from the timing of the line in the line thinning-out mode until the pixel signal is read in the line non-thinning-out mode, as indicated in the equation (3).

$$PV2s = Va + Vpls1 + Vpls2 \quad (3)$$

The signal processing unit 16 supplies the pixel signal read in the line non-thinning-out mode to the correction unit 162. Furthermore, the signal processing unit 16 supplies the pixel signal read in the line thinning-out mode stored in the memory unit 161 to the correction unit 162.

The correction unit 162 of the signal processing unit 16 uses the pixel signal read in the line thinning-out mode and the pixel signal read in the line non-thinning-out mode to perform the correction processing on the pixel signal read in the line non-thinning-out mode, and reduces the noise component due to leakage light. As the correction processing, the correction unit 162 sets an amount of correction for a pixel of a line thinned out in the line thinning-out mode, on the basis of a signal difference between pixel signals at the same position read in the line thinning-out mode and the line non-thinning-out mode, and corrects a signal of the pixel by using the set amount of correction.

Figure 9:
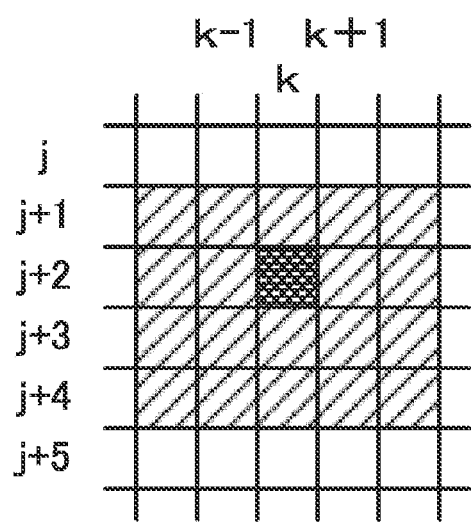
FIG. 9 is a diagram for explaining correction processing.

FIG. 9 is a diagram for explaining the correction processing. The correction unit 162 sets the amount of correction for the correction target pixel in the line thinned out in the line thinning-out mode, on the basis of, for example, a signal difference between pixels read in the line thinning-out mode and the line non-thinning-out mode and close to the correction target pixel.

In FIG. 9, lines j and j+5 are lines in which reading of pixel signals is performed in the line thinning-out mode, and lines j+1 to j+4 are lines in which reading of pixel signals is not performed in the line thinning-out mode. Here, for example, in a case where a pixel (j+2, k) in the line j+2 is the correction target pixel, an average value is calculated of pixel signals of pixels (j, k−1), (j, k), and (j, k+1) in the line j and pixels (j+5, k−1), (j+5, k), and (j+5, k+1) in the line j+5, that is, pixel signals indicating only the noise component Vpls2, and is set as an amount of correction for the pixel (j+2, k). Note that, the correction value is not limited to the average value of the pixel signals indicating only the noise component of the pixels positioned around the correction target pixel. For example, an average value calculated by increasing weight of a pixel having a short distance from the correction target pixel may be used as the correction value. Furthermore, if the number of peripheral pixels used for calculating the correction value is increased, variation in the correction value can be reduced. Note that, when the number of peripheral pixels used for calculating the correction value is increased, the spatial resolution of the correction is decreased, so that the number of peripheral pixels or the like may be set in consideration of characteristics required in the correction processing.

The correction unit 162 subtracts the calculated amount of correction from the pixel signal of the pixel (j+2, k) that is a correction target. If such correction processing is performed, in the corrected pixel signal, it is possible to remove the noise component generated by the leakage light during a period from when reading of pixel signals is completed in the line thinning-out mode until reading of pixel signals is performed in the line non-thinning-out mode. Furthermore, the corrected pixel signal includes a noise component generated by leakage light during a period from the global transfer until reading of pixel signals is performed in the line thinning-out mode, but the period from the global transfer until the reading is performed in the line thinning-out mode is set to a shorter period than in the line non-thinning-out mode. Thus, in the corrected pixel signal, the influence by the leakage light can be reduced as compared with a conventional operation of reading pixel signals in the line non-thinning-out mode after the global transfer.

The interface unit 163 sets the pixel signals read in the line thinning-out mode stored in the memory unit 161 and the pixel signals corrected by the correction unit 162 for the pixel signals of the line thinned out in the line thinning-out mode in line order, and outputs the still image signal.

FIGS. 10A, 10B, 10C, 10D, 10E, 10F, and 10G are diagrams exemplifying the noise component in each operation for each line. Note that, in FIGS. 10A, 10B, 10C, 10D, 10E, 10F, and 10G, it is assumed that leakage light in each line is equal.

Figure 10G:
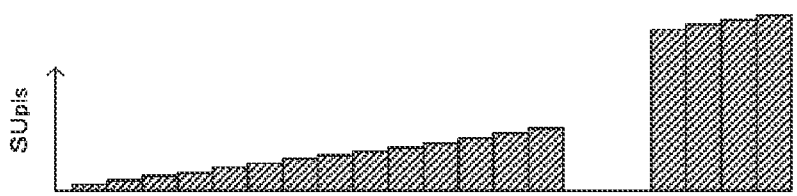
FIGS. 10A, 10B, 10C, 10D, 10E, 10F, and 10G are diagrams exemplifying a noise component in each operation for each line.
Figure 10F:
Figure 10E:
Figure 10D:
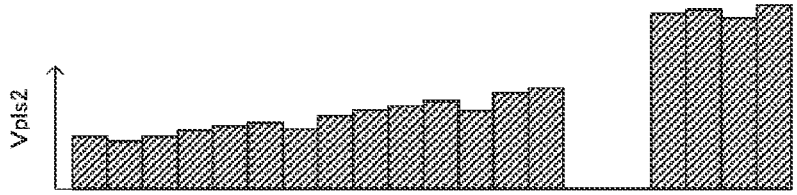
Figure 10C:
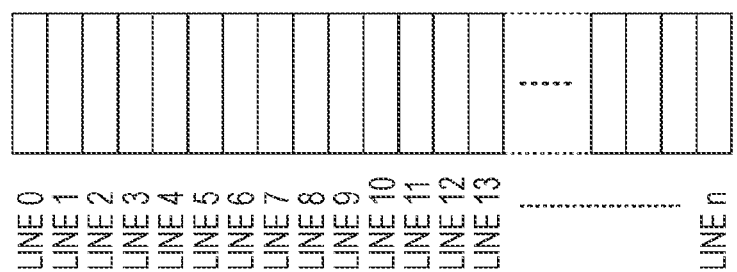
Figure 10B:
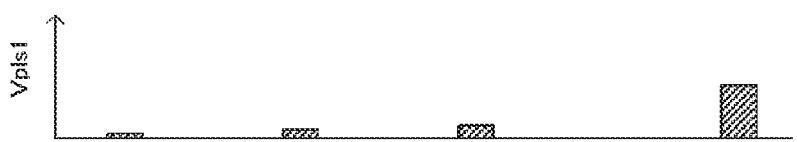
Figure 10A:
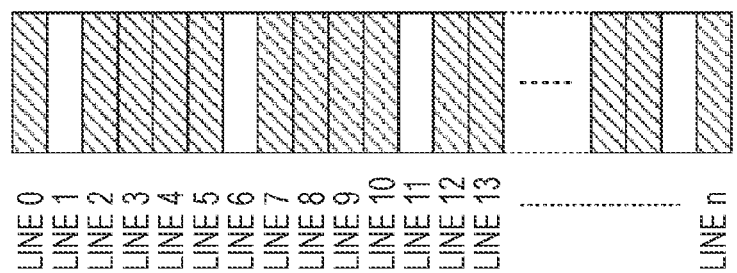

In FIG. 10A, lines thinned out in the line thinning-out mode are illustrated by oblique lines. In FIG. 10B, the noise component Vpls1 is illustrated due to leakage light of the pixel signal read in the line thinning-out mode, and the noise component Vpls1 is large in a line with later reading order.

In FIG. 10C, lines are illustrated in which reading of pixel signals is performed in the line non-thinning-out mode. In FIG. 10D, a noise component is illustrated due to leakage light of the pixel signals read in the line non-thinning-out mode. Note that, a noise component of a line from which pixel signals are read in the line thinning-out mode is the noise component Vpls2, and the noise component Vpls2 is large in a line with later reading order. Furthermore, a noise component of the line in which the reading of the pixel signals is thinned out in the line thinning-out mode is a noise component (Vpls1+Vpls2), and the noise component (Vpls1+Vpls2) is large in a line with later reading order.

In FIG. 10E, a corrected noise component Vplsc is illustrated of the line in which the reading of the pixel signals is thinned out in the line thinning-out mode, and the noise reduction due to leakage light is reduced as compared with FIG. 10D.

In FIG. 10F, a noise component SVpls is illustrated due to leakage light of the image signal output from the interface unit 163, and the noise component (Vpls1+Vpls2) is reduced in the line in which the reading of the pixel signals is thinned out in the line thinning-out mode and is the noise component Vpls1 in the line in which the reading of the pixel signals is thinned out in the line thinning-out mode.

In FIG. 10G, a noise component SUpls due to leakage light is illustrated of the conventional operation of reading the pixel signal in the line non-thinning-out mode after the global transfer.

FIGS. 11A, 11B, 11C, and 11D illustrate an operation example of the first embodiment. In FIG. 11A, a background of a scene is exemplified, and a light source LT having a rectangular shape is included in the background. In FIG. 11B, a moving object OBm is included in an imaging range, and the moving object OBm is positioned in front of the light source LT. At a time point td1, the light source LT is hidden by the moving object OBm, and the moving object OBm moves in an arrow MV direction over time. Thus, even if the light source LT is hidden by the moving object OBm at a time point td2, when the moving object OBm deviates from the light source LT at a time point td3, light emitted from the light source LT is incident on the pixel array unit 11. Here, when reading of pixel signals for each line is continuously performed after the time point td3, a noise component due to leakage light is generated by the light emitted from the light source LT. Thus, for example, in a case where a shutter operation is performed at a timing of the time point td2, in the operation of the first embodiment, the correction processing on the pixel signal read in the line non-thinning-out mode is performed on the basis of the pixel signal of the line read in the line thinning-out mode and the pixel signal of the line read in the line non-thinning-out mode, so that correction is performed for the influence of the leakage light, and it is possible to prevent an image of the light source LT from being displayed as noise in a region of the moving object OBm, as illustrated in FIG. 11C. Note that, in FIG. 11D, an image is exemplified in a case where the pixel signal is read in the line non-thinning-out mode after the global transfer, and a noise image due to the leakage light is generated at a position of the light source LT in the region of the moving object OBm.

As described above, the correction processing on the pixel signal read in the second mode is performed by using the pixel signal read in the line thinning-out mode and the pixel signal read in the second mode in which reading of pixel signals is performed by including lines thinned out in the line thinning-out mode after the reading in the line thinning-out mode, whereby it becomes possible to reduce the influence by the leakage light.

Note that, in a case where the pixel array unit 11 is provided with a color filter having a pixel configuration of a plurality of color components, an amount of noise generated for each color differs depending on the color of the leakage light. Thus, the signal processing unit 16 performs the correction processing for each color component, and uses pixels of the same color as the correction target pixel as the peripheral pixels used for calculating the correction value.

Furthermore, as a line thinning-out rate in the line thinning-out mode increases, the reading of the pixel signals in the line thinning-out mode can be completed faster, so that it is possible to reduce the noise component included in the pixel signal read in the line thinning-out mode, in a line that is a reference for calculating the noise component, that is, the line read in the line thinning-out mode and the line non-thinning-out mode. However, since the number of lines is reduced in which reading of pixel signals is performed, the spatial resolution of the correction is decreased. Thus, an optimum thinning-out rate is selected depending on an imaging condition in consideration of the spatial resolution of the correction and a remaining correction trade-off. For example, the thinning-out rate may be adjusted depending on the exposure time. In this case, since a subject is bright when the exposure time is short, the thinning-out rate is increased so that the influence of the leakage light is reduced.

Furthermore, when the noise component is proportional to a time until reading of pixel signals, the noise component in the pixel signal read in the line thinning-out mode can be estimated for the line read in the line thinning-out mode and the line non-thinning-out mode. As described above, in the line read in the line thinning-out mode and the line non-thinning-out mode, the pixel signal read in the line non-thinning-out mode is a signal indicating the noise component Vpls2 as indicated in the equation (2). Furthermore, in a case where a first waiting time WT1 is from the global transfer until the pixel signal is read in the line thinning-out mode, and a second waiting time WT2 is from when the pixel signal is read in the line thinning-out mode until the pixel signal is read in the line non-thinning-out mode, a ratio between the first waiting time WT1 and the second waiting time WT2 is equal to a ratio between the noise component Vpls1 and the noise component Vpls2, so that on the basis of the first waiting time WT1, the second waiting time WT2, and the pixel signal (noise component Vpls2) read in the line non-thinning-out mode, the noise component Vpls1 in the pixel signal read in the line thinning-out mode can be estimated by the equation (4).

$$Vpls1 = Vpls2 \times (WT1/WT2) \qquad (4)$$

Thus, the amount of correction for the line read in the line thinning-out mode and the line non-thinning-out mode may be set on the basis of a calculation result of the equation (4). Moreover, on the basis of the noise component Vpls1 in the line read in the line thinning-out mode and the line non-thinning-out mode, the noise component Vpls1 of the line in which the reading of the pixel signals is thinned out in the line thinning-out mode is estimated by a method similar to that described with reference to FIG. 9, for example, and if the correction processing is performed by using also an amount of correction depending on the estimated noise component Vpls1, the influence by the leakage light can be further reduced.

3. Second Embodiment

Next, a second embodiment will be described. In the second embodiment, a case will be described where a moving image and a still image can be seamlessly acquired and correction is performed for an influence of leakage light without decreasing the spatial resolution and the like of the still image. Note that, the number of pixels in the horizontal direction and the vertical direction of the moving image is smaller than that of the still image.

In the second embodiment, the solid-state imaging device 10 performs global reset, global transfer, and reading of pixel signals in the line thinning-out mode, on a frame basis. Furthermore, the vertical drive unit 13 is capable of independently controlling the global transfer for lines constituting the moving image and the global transfer for other lines, in the global transfer.

To acquire the moving image, the solid-state imaging device 10 performs global reset, global transfer of the lines constituting the moving image, and reading of pixel signals of the lines constituting the moving image in the line thinning-out mode, on a frame basis, and resizes the number of pixels of the read lines to the number of pixels depending on the moving image, and outputs the pixel signals as a moving image signal. Furthermore, in the case of acquisition of the still image, global reset and global transfer of the lines constituting the moving image and the other lines are performed, and pixel signals of the lines constituting the moving image and thinned out lines not used for the moving image are read in the line thinning-out mode. Furthermore, reading of pixel signals is performed in a moving image line thinning-out mode in which reading of the pixel signals is performed by thinning out the lines constituting the moving image after reading in the line thinning-out mode, the correction processing is performed of the pixel signals read in the moving signal thinning-out mode by using the pixel signals read in the line thinning-out mode and the moving image line thinning-out mode, and a still image signal is output in which the influence of the leakage light is reduced.

Figure 12:
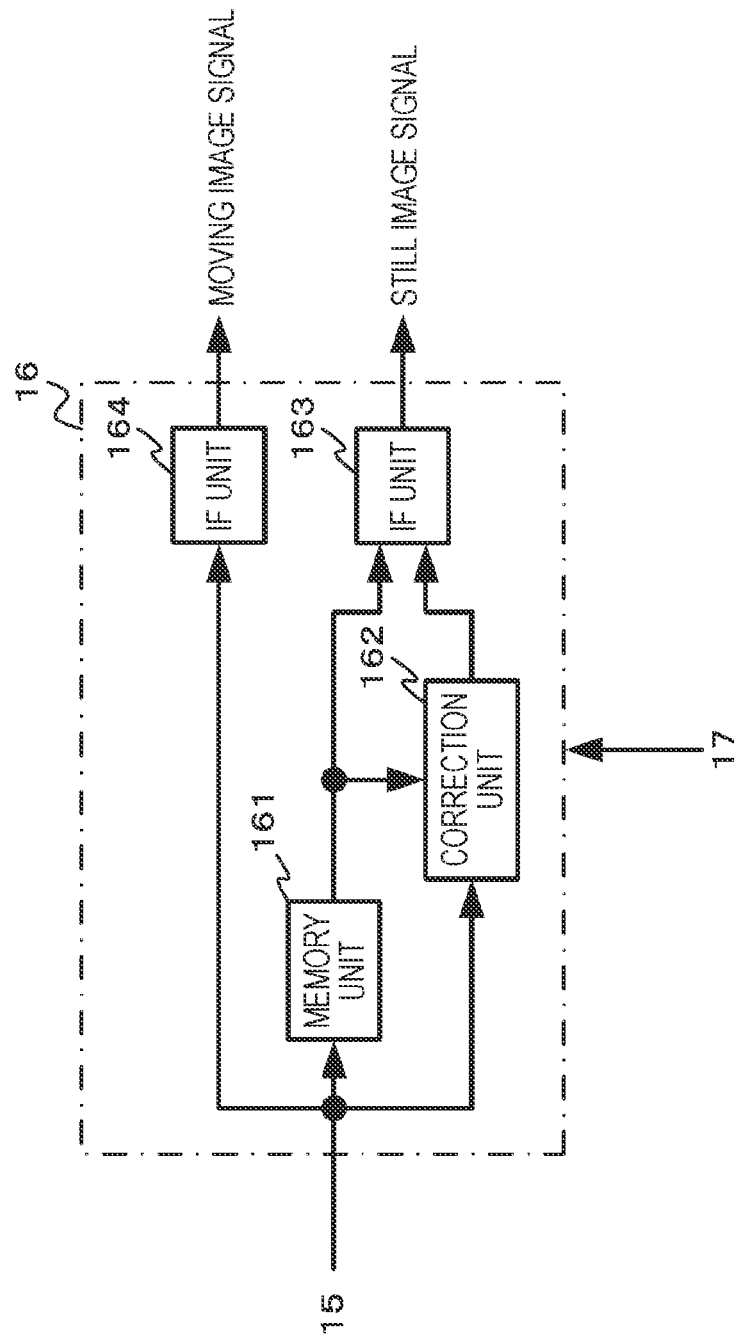
FIG. 12 illustrates a configuration of a signal processing unit in a second embodiment.

FIG. 12 illustrates a configuration of a signal processing unit in the second embodiment. The signal processing unit 16 includes the memory unit 161, the correction unit 162, and interface (IF) units 163 and 164. A pixel signal supplied from the column processing unit 15 is supplied to the memory unit 161, the correction unit 162, and the IF unit 164.

The memory unit 161 stores the pixel signal read in the line thinning-out mode after the shutter operation and supplied from the column processing unit 15. Specifically, the pixel signal is stored of the thinned out lines not used for the moving image read in the line thinning-out mode. Furthermore, the memory unit 161 outputs the stored pixel signal to the correction unit 162 and the IF unit 163.

The pixel signal read in the moving image line thinning-out mode in which reading is performed of the pixel signal of lines in which the lines constituting the moving image is excluded after the reading in the line thinning-out mode, is supplied to the correction unit 162 from the column processing unit 15. The correction unit 162 sets an amount of correction for a pixel read in the moving image line thinning-out mode, on the basis of a pixel signal read in the moving image line thinning-out mode supplied from the column processing unit 15 and a pixel signal read in the line thinning-out mode stored in the memory unit 161, and corrects a signal of the pixel on the basis of the set amount of correction. The correction unit 162 outputs a corrected pixel signal to the interface unit 163.

The interface unit 163 selects pixel signals stored in the memory unit 161 and pixel signals on which the correction processing is performed by the correction unit 162 in line order and outputs them as the still image signal. Furthermore, the interface unit 164 resizes the number of pixels of the lines constituting the moving image read in the line thinning-out mode and supplied from the column processing unit 15 to the number of pixels of the moving image, and outputs the pixel signals as the moving image signal.

Figure 13:
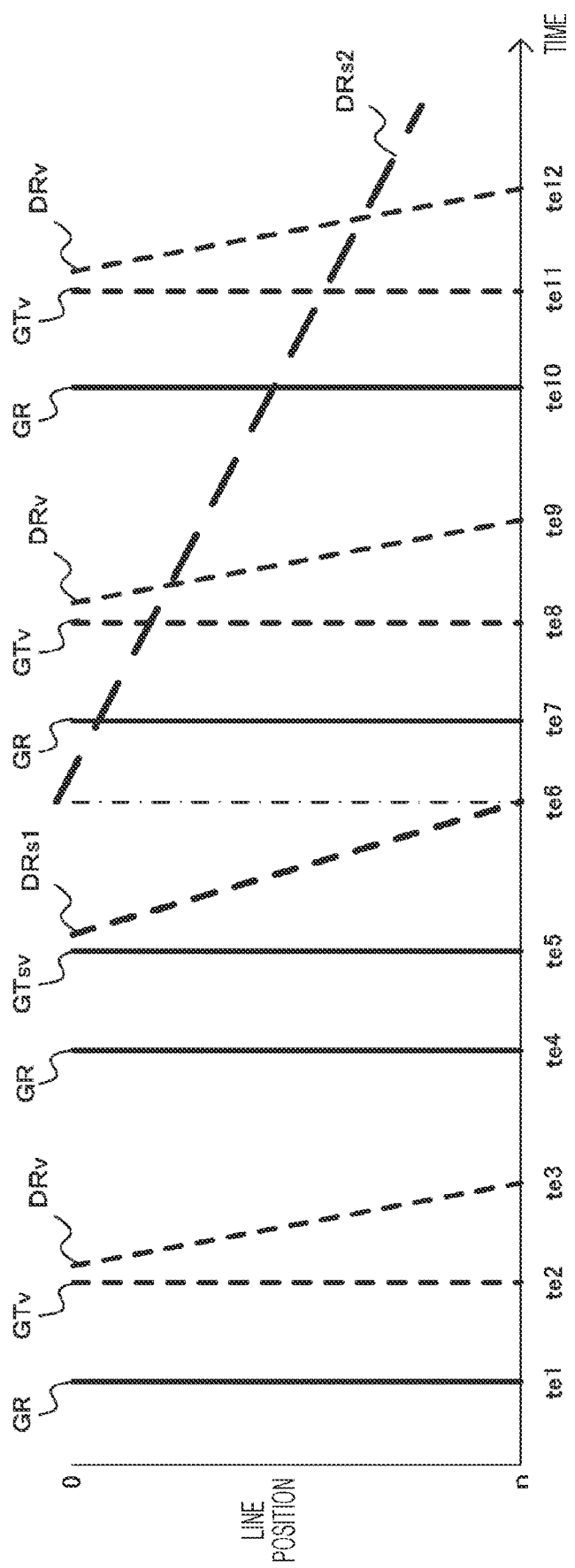
FIG. 13 is a diagram for explaining operation of the second embodiment.

FIG. 13 is a diagram for explaining operation of the second embodiment, and illustrates reading of pixel signals. The control unit 17 performs the global reset GR at a time point te1 and then performs global transfer GTv for the lines constituting the moving image at a time point te2. Thereafter, reading DRv of pixel signals is performed in the line thinning-out mode. In the reading DRv in the line thinning-out mode, since the shutter operation is not performed, reading is performed of pixel signals of the lines constituting the moving image. Note that, the reading DRv ends at a time point te3 before global reset GR is performed at a time point te4.

In a case where the shutter operation is performed during a period until the time point te4 at which one frame period has elapsed from the time point te1, the global reset GR is performed at the time point te4, and then global transfer GTsv is performed for the lines constituting the moving image and lines not used for the moving image at the time point te5, and reading DRs1 of pixel signals is performed in the line thinning-out mode. In the reading DRs1 in the line thinning-out mode, since the shutter operation is performed, reading is performed of the pixel signals of the lines constituting the moving image and the thinned out lines not used for the moving image. Note that, the reading DRs1 ends at a time point te6 before global reset GR is performed at a time point te7. When the reading DRs1 in the line thinning-out mode ends, the control unit 17 subsequently performs reading DRs2 of pixel signals in the moving image line thinning-out mode.

During a period in which the reading DRs2 of the pixel signals is performed in the moving image line thinning-out mode, when the time point te1 is reached at which one frame period has elapsed from the time point te4, the control unit 17 performs the global reset GR and then performs global transfer GTv for the lines constituting the moving image at a time point te8. Thereafter, reading DRv of pixel signals is performed in the line thinning-out mode. In the reading DRv in the line thinning-out mode, since the shutter operation is not performed during a period from the time point te4 to the time point te7, reading of pixel signals is performed only for the lines constituting the moving image. Note that, the reading DRv ends at a time point te9 before global reset GR is performed at a time point te10.

Furthermore, the control unit 17 performs the global reset GR at the time point te10 at which one frame period has elapsed from the time point te7, and then performs global transfer GTv for the line constituting the moving image at a time point te11. Thereafter, reading of the pixel signal is performed only for the line constituting the moving image by reading DRv of pixel signals in the line thinning-out mode.

After that, similarly, global reset GR, global transfer GTv, and reading DRv of pixel signals in the line thinning-out mode are repeated at a frame period of the moving image.

Figure 14:
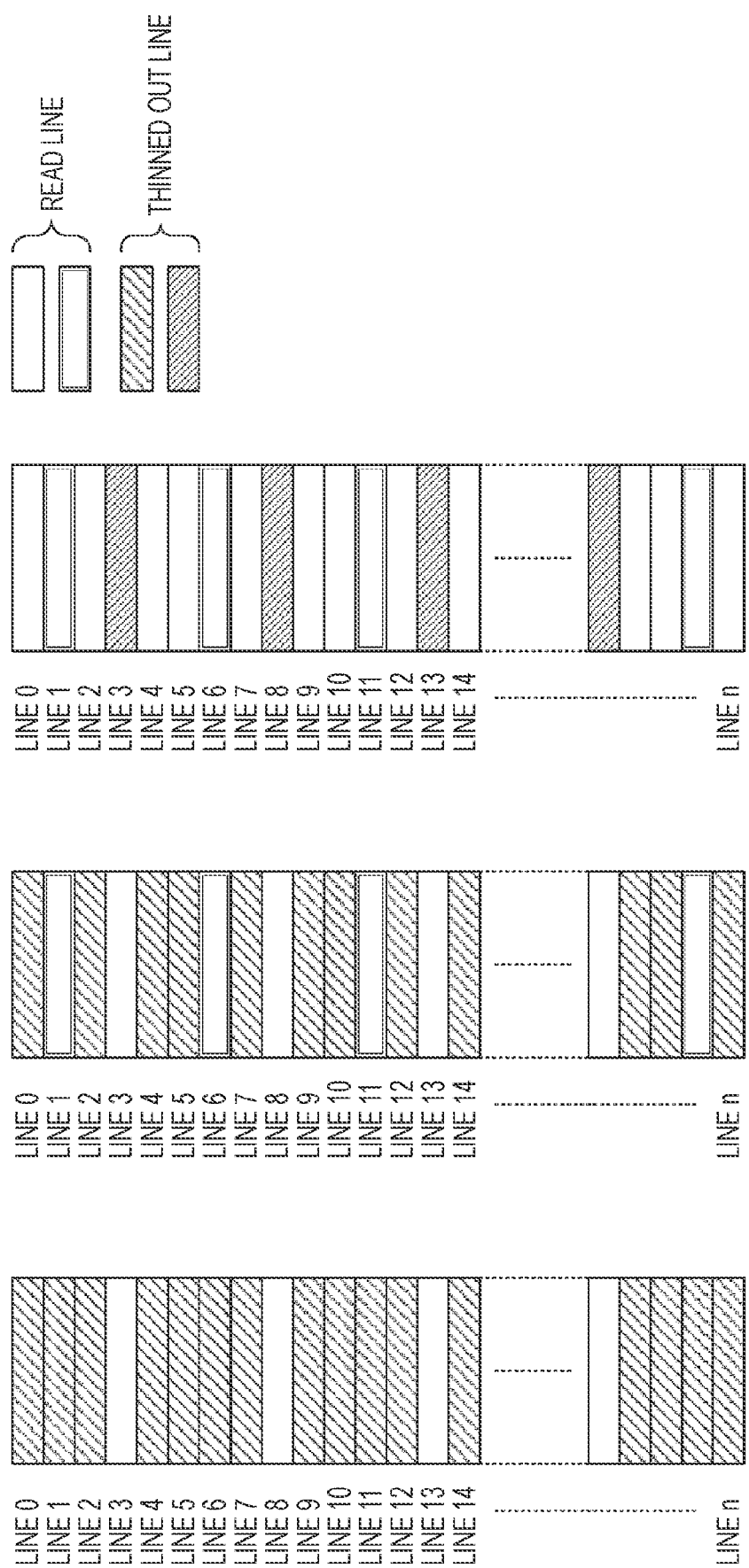
FIGS. 14A, 14B, and 14C are diagrams exemplifying in which operation each line is to be a read target of a pixel signal.

FIGS. 14A, 14B, and 14C exemplifies in which operation each line is to be a read target of the pixel signal. In FIG. 14A, lines are exemplified in which pixel signals are read in generation of a moving image. In the generation of the moving image, an interval of the read lines is set to, for example, a five-line interval, and line thinning-out is performed for four lines, and reading of the pixel signals is performed from the line 3, line 8, line 13, . . . .

Thereafter, in a case where the shutter operation is performed and pixel signals are read in the line thinning-out mode, the pixel signals are read by thinning out lines constituting the moving image and other lines excluding lines not used for the moving image, as illustrated in FIG.

14B. For example, the pixel signals are read of the line 3, line 8, line 13, . . . that constitute the moving image, and the line 1, line 6, line 11, . . . that are not used in the moving image and has been thinned out. Note that, in FIG. 14B, a case is exemplified where the interval of the lines not used for the moving image is equal to the interval of the lines constituting the moving image, but the interval of the lines may be set differently.

Next, in the moving image line thinning-out mode, as illustrated in FIG. 14C, pixel signals are read by thinning out the lines constituting the moving image. For example, by thinning out the line 3, line 8, line 13, . . . constituting the moving image, the pixel signals are read of the line 0, line 1, line 2, line 4 to line 7, line 9 to line 12, . . . .

By performing reading of the pixel signals in this way, even if effective signals of the line 3, line 8, line 13, . . . constituting the moving image change for each frame, effective signals are held of the line 0, line 2, line 4, line 5, line 7, . . . when the shutter operation is performed.

Figure 15:
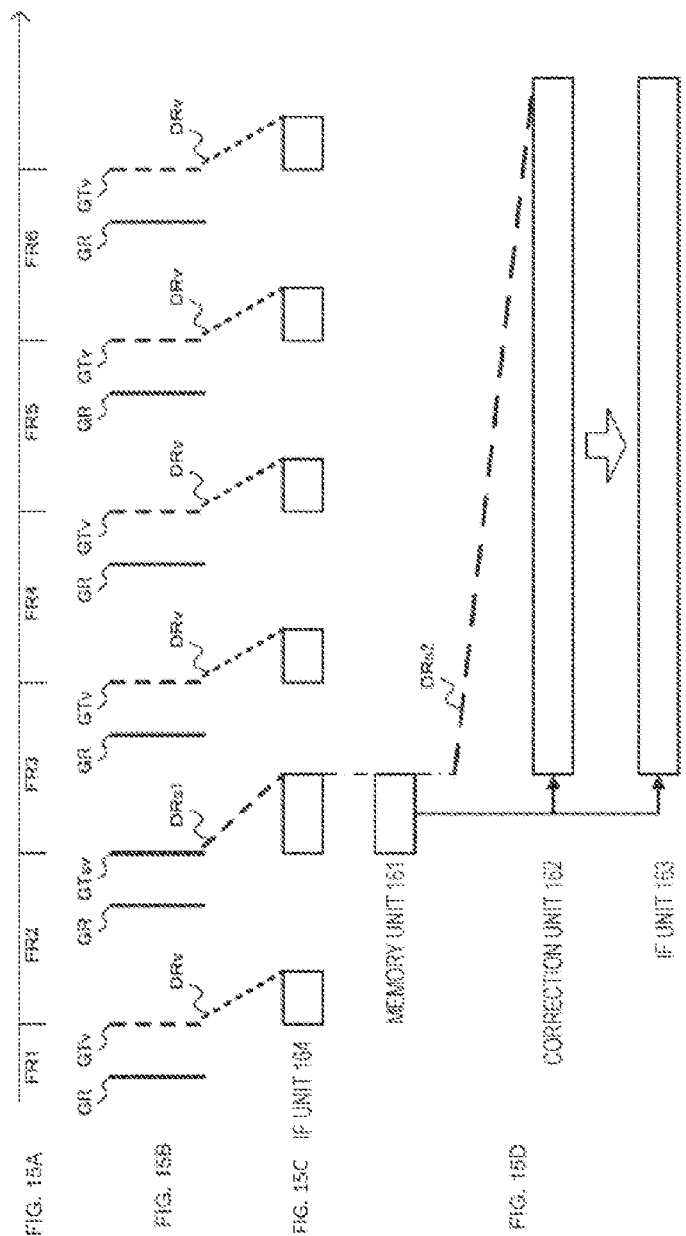
FIGS. 15A, 15B, 15C, and 15D are diagrams for explaining operation of the second embodiment.

FIGS. 15A, 15B, 15C, and 15D are diagrams for explaining operation of the second embodiment of the signal processing unit. In FIG. 15A, frames are illustrated, and in FIG. 15B, charge storage operation is illustrated. Furthermore, in FIG. 15C, moving image output operation is illustrated, and in FIG. 15D, still image output operation is illustrated.

In a period of a frame FR1, global reset GR is performed, and then global transfer GTv is performed on the lines constituting the moving image after a lapse of a predetermined exposure period, and in a period of a frame FR2, reading DRv of pixel signals is performed in the line thinning-out mode, and the read pixel signals are output from the column processing unit 15 to the signal processing unit 6. The interface unit 164 of the signal processing unit 16 performs resizing processing of setting a predetermined number of pixels in the horizontal direction on the pixel signals supplied from the column processing unit 15, and generates and outputs an image signal of one frame of the moving image.

In a case where the shutter operation is performed during the period of the frame FR2, the global reset GR is performed, and then the global transfer GTsv is performed for the lines constituting the moving image and other lines not used for the moving image after a lapse of the predetermined exposure period, and in a frame FR3, the reading DRs1 of the pixel signals is performed in the line thinning-out mode, and the read pixel signals are output from the column processing unit 15 to the signal processing unit 16. The interface unit 164 of the signal processing unit 16 performs the resizing processing of setting the predetermined number of pixels in the horizontal direction on the pixel signals of the lines constituting the moving image in the pixel signals supplied from the column processing unit 15, and generates and outputs an image signal of one frame of the moving image.

Furthermore, the memory unit 161 of the signal processing unit 16 stores the pixel signals of the thinned out lines not used for the moving image supplied from the column processing unit 15.

When reading DRs1 of pixel signals ends in the line thinning-out mode, reading DRs2 of pixel signals is performed in the moving image line thinning-out mode, and the read pixel signals are output from the column processing unit 15 to the signal processing unit 16. The correction unit 162 of the signal processing unit 16 uses the pixel signals supplied from the column processing unit 15, and the pixel signals of the lines not used for the moving image in the pixel signals stored in the memory unit 161, to perform the correction processing on the pixel signals read in the moving image line thinning-out mode similarly to the first embodiment.

When the frame FR3 is reached when the reading DRs2 of the pixel signals is performed in the moving image line thinning-out mode, global reset GR is performed, and then global transfer GTv is performed on the lines constituting the moving image after a lapse of the predetermined exposure period, and in a frame FR4, reading DRv of pixel signals is performed in the line thinning-out mode, and the read pixel signals are output from the column processing unit 15 to the signal processing unit 6. The interface unit 164 of the signal processing unit 16 performs the resizing processing of setting the predetermined number of pixels in the horizontal direction on the pixel signals supplied from the column processing unit 15, and generates and outputs an image signal of one frame of the moving image.

Furthermore, global reset GR, global transfer GTv for the lines constituting the moving image, and reading DRv of pixel signals in the line thinning-out mode are repeatedly performed, whereby an image signal of the moving image is output from the interface unit 164.

When the reading DRs2 of the pixel signals is completed in the moving image line thinning-out mode, the interface unit 163 sets the pixel signals stored in the memory unit 161 and the pixel signals corrected by the correction unit 162 in line order, and outputs an image signal of the still image.

If the reading of the pixel signals and the correction processing on the read pixel signals are performed in this way, it is possible to output the image signal of the still image in which the influence of the leakage light is reduced without interrupting output of the pixel signals of the moving image. That is, there is no blackout period of the moving image or wobbling of the picture, and imaging of the still image can be seamlessly performed even during imaging of the moving image.

4. Configuration of Electronic Device

Figure 16:
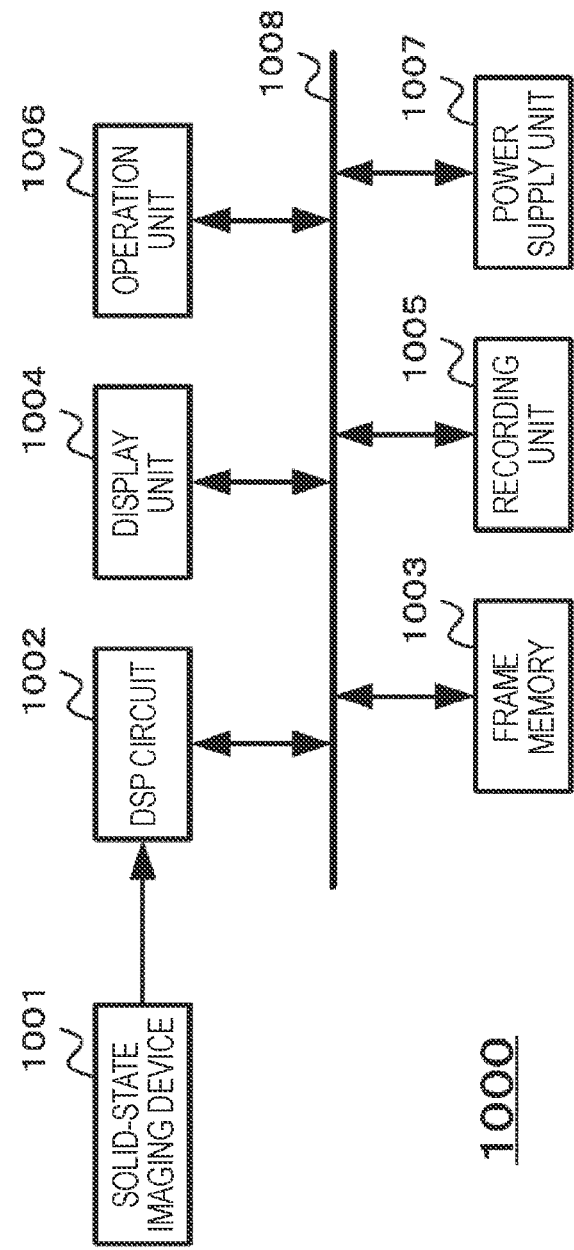
FIG. 16 is a block diagram illustrating a configuration example of an electronic device including the solid-state imaging device.

FIG. 16 is a block diagram illustrating a configuration example of an electronic device including the solid-state imaging device to which the present technology is applied.

An electronic device 1000 is, for example, an electronic device, such as an imaging device such as a digital still camera or a video camera, or a mobile terminal device such as a smartphone or a tablet terminal.

The electronic device 1000 includes a solid-state imaging device 1001, a DSP circuit 1002, a frame memory 1003, a display unit 1004, a recording unit 1005, an operation unit 1006, and a power supply unit 1007. Furthermore, in the electronic device 1000, the DSP circuit 1002, the frame memory 1003, the display unit 1004, the recording unit 1005, the operation unit 1006, and the power supply unit 1007 are connected to each other via a bus line 1008. Note that, the solid-state imaging device 1001 corresponds to the solid-state imaging device 10 described above.

The DSP circuit 1002 is a camera signal processing circuit that processes a signal supplied from the solid-state imaging device 1001. The DSP circuit 1002 outputs image data obtained by processing the signal from the solid-state imaging device 1001. The frame memory 1003 temporarily holds the image data processed by the DSP circuit 1002 on a frame basis.

The display unit 1004 includes, for example, a panel type display device such as a liquid crystal panel or an organic electro luminescence (EL) panel, and displays a moving image or a still image imaged by the solid-state imaging device 1001. The recording unit 1005 records the image data of the moving image or the still image imaged by the solid-state imaging device 1001 in a recording medium such as a semiconductor memory or a hard disk.

The operation unit 1006 outputs operation commands for various functions of the electronic device 1000, in accordance with operation by a user. The power supply unit 1007 supplies various power sources being operation power sources for the DSP circuit 1002, the frame memory 1003, the display unit 1004, the recording unit 1005, and the operation unit 1006, to these supply targets as appropriate.

5. Usage Examples of Image Sensor

Figure 17:
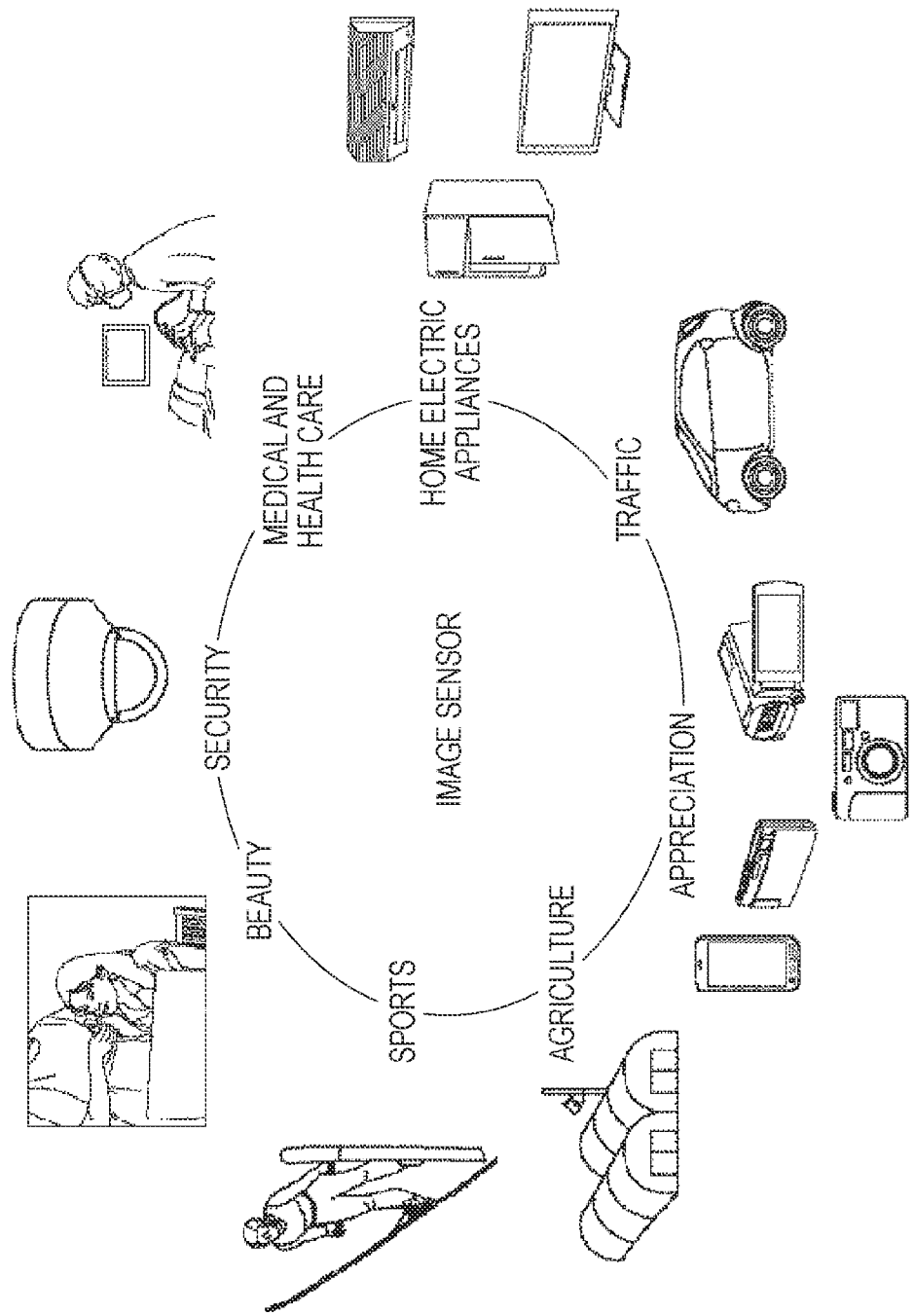
FIG. 17 is a diagram illustrating usage examples of the solid-state imaging device.

FIG. 17 is a diagram illustrating usage examples of the solid-state imaging device to which the present technology is applied. The solid-state imaging device 10 can be used for various cases of sensing light such as visible light, infrared light, ultraviolet light, or X-rays, for example, as follows. That is, as illustrated in FIG. 16, the solid-state imaging device 10 can be used not only in a field of appreciation in which an image to be used for appreciation is imaged, but also in a device used in, for example, a field such as a field of traffic, a field of home electric appliances, a field of medical and health care, a field of security, a field of beauty, a field of sports, or a field of agriculture.

Specifically, in the field of appreciation, the solid-state imaging device 10 can be used in a device (for example, the electronic device 1000 of FIGS. 8A, 8B, and 8C) for imaging the image to be used for appreciation, for example, a digital camera, a smartphone, a mobile phone with a camera function, and the like.

In the field of traffic, for example, the solid-state imaging device 10 can be used in devices to be used for traffic, such as an automotive sensor for imaging ahead of, behind, around, and inside the car, a monitoring camera for monitoring traveling vehicles and roads, and a distance measurement sensor for measuring a distance between vehicles and the like, for safe driving such as automatic stop, and recognition of driver's condition.

In the field of home electric appliances, for example, the solid-state imaging device 10 can be used in devices to be used for home electric appliances, such as a television receiver, a refrigerator, and an air conditioner, for imaging a user's gesture and performing device operation in accordance with the gesture. Furthermore, in the field of medical and health care, the solid-state imaging device 10 can be used in devices to be used for medical and health care, for example, an endoscope, a device for performing angiography by receiving infrared light, and the like.

In the field of security, the solid-state imaging device 10 can be used in devices to be used for security, for example, a monitoring camera for crime prevention, a camera for person authentication, and the like. Furthermore, in the field of beauty, the solid-state imaging device 10 can be used in devices to be used for beauty, for example, a skin measuring instrument for imaging skin, a microscope for imaging a scalp, and the like.

In the field of sports, the solid-state imaging device 10 can be used in devices to be used for sports, for example, an action camera for sports application, a wearable camera, and the like. Furthermore, in the field of agriculture, the solid-state imaging device 10 can be used in devices to be used for agriculture, for example, a camera for monitoring conditions of fields and crops, and the like.

The series of processing steps described in the specification can be executed by hardware, software, or a combination of both. In a case where processing by software is executed, a program recording a processing sequence is installed in a memory in a computer incorporated in dedicated hardware and executed. Alternatively, the program can be installed and executed in a general-purpose computer capable of executing various types of processing.

For example, the program can be recorded in advance in Read Only Memory (ROM), a Solid State Drive (SSD) or a hard disk as a recording medium. Alternatively, the program can be temporarily or permanently stored (recorded) in a removable recording medium such as a flexible disk, compact disc read only memory (CD-ROM), magneto optical (MO) disk, digital versatile disc (DVD), Blu-ray Disc (registered trademark) (BD), magnetic disk, or semiconductor memory card. Such a removable recording medium can be provided as so-called packaged software.

Furthermore, the program may be transferred wirelessly or by wire to the computer from a download site through a network such as a local area network (LAN) or the Internet, besides being installed from the removable recording medium to the computer. The computer can receive the program transmitted in that way, and install the program in the recording medium such as a built-in hard disk.

Note that, the advantageous effects described in this specification are merely exemplifications, and the advantageous effects of the present technology are not limited to them and may include additional effects that are not described herein. Furthermore, the present technology should not be interpreted to be limited to the embodiments of the technology described above. The embodiments of this technology disclose the present technology through exemplifications, and it is obvious that those skilled in the art can perform modification or substitution of the embodiments without departing from the scope of the present technology. That is, to determine the gist of the present technology, the claims should be taken into consideration.

Furthermore, the solid-state imaging device of the present technology can also have the following configuration.

(1) A solid-state imaging device including a signal processing unit that uses pixel signals read in a first mode in which reading of the pixel signals is performed by thinning out lines from a pixel array unit in which pixels that generate pixel signals are arranged in a matrix, and pixel signals read in a second mode in which reading of the pixel signals is performed by including the lines thinned out in the first mode after the reading in the first mode, to perform correction processing on the pixel signals read in the second mode.

(2) The solid-state imaging device according to (1), in which the signal processing unit sets an amount of correction for a pixel of the lines thinned out in the first mode, on the basis of a pixel signal read in the second mode from a pixel in which reading of the pixel signal is performed in the first mode and the second mode.

(3) The solid-state imaging device according to (2), in which the signal processing unit sets an amount of correction for a correction target pixel in the lines thinned out in the first mode, on the basis of a pixel signal read in the second mode of a pixel that is close to the correction target pixel and in which reading of the pixel signal is performed in the first mode and the second mode.

(4) The solid-state imaging device according to any of (1) to (3), in which the signal processing unit sets an amount of correction on the basis of pixel signals read in the first mode and the second mode, and a time until reading is performed in the first mode and a time from the reading in the first mode until reading is performed in the second mode, for each pixel in which reading of the pixel signals is performed in the first mode and the second mode.

(5) The solid-state imaging device according to any of (1) to (4), in which the second mode is a mode in which reading of pixel signals is performed without thinning out lines.

(6) The solid-state imaging device according to any of (1) to (4), in which lines from which pixel signals are read in the first mode include lines constituting a moving image and lines not used for the moving image, lines from which pixel signals are read in the second mode are lines in which the lines constituting the moving image are excluded, and the reading of the pixel signals in the first mode is performed for each frame of the moving image, and the signal processing unit outputs pixel signals of the lines of the moving image in the lines read in the first mode as a moving image signal, performs correction processing on the pixel signals read in the second mode on the basis of the pixel signals of the pixels read in the first mode and the second mode, and outputs pixel signals after the correction processing as a still image signal.

(7) The solid-state imaging device according to any of (1) to (6), further including a control unit that controls reading of pixel signals from the pixel array unit, in which the control unit adjusts a line thinning-out rate in the first mode depending on an exposure time of the pixels.

(8) The solid-state imaging device according to any of (1) to (7), in which in a case where the pixels of the pixel array unit include pixels of respective color components, the signal processing unit performs the correction processing on the pixel signals for each color component.

REFERENCE SIGNS LIST

10 Solid-state imaging device
11 Pixel array unit
12 Pixel
13 Vertical drive unit
14 Horizontal drive unit
15 Column processing unit
16 Signal processing unit
17 Control unit
161 Memory unit
162 Correction unit
163, 164 Interface (IF) unit

The invention claimed is:

1. A solid-state imaging device, comprising:
circuitry configured to:
set an amount of correction based on first pixel signals read in a first mode and second pixel signals read in a second mode, and a time until reading of the first pixel signals is performed in the first mode and a time from the reading in the first mode until reading of the second pixel signals is performed in the second mode; and
perform correction processing on the second pixel signals read in the second mode based on the first pixel signals read in the first mode and the second pixel signals read in the second mode, wherein
the reading of the first pixel signals in the first mode is based on thinning out lines from a pixel array unit in which pixels that generate pixel signals are in a matrix, and
the reading of the second pixel signals in the second mode is based on the lines thinned out in the first mode after the reading in the first mode.

2. The solid-state imaging device according to claim 1, wherein the circuitry is further configured to set, based on a pixel signal read in the second mode from a pixel in which reading of the pixel signal is performed in the first mode and the second mode, the amount of correction for a pixel of the lines thinned out in the first mode.

3. The solid-state imaging device according to claim 2, wherein
the circuitry is further configured to set the amount of correction for a correction target pixel in the lines thinned out in the first mode, and
the amount of correction for the correction target pixel is set based on the pixel signal read in the second mode of a pixel that is close to the correction target pixel and in which reading of the pixel signal is performed in the first mode and the second mode.

4. The solid-state imaging device according to claim 1, wherein the second mode is a mode in which the reading of the second pixel signals is performed without thinning out lines.

5. The solid-state imaging device according to claim 1, wherein
lines from which first pixel signals are read in the first mode include lines constituting a moving image and lines not used for the moving image,
lines from which the second pixel signals are read in the second mode are lines in which the lines constituting the moving image are excluded,
the reading of the first pixel signals in the first mode is performed for each frame of the moving image, and
the circuitry is further configured to:
output pixel signals of the lines of the moving image in the lines read in the first mode as a moving image signal;
perform the correction processing on the second pixel signals read in the second mode based on the first pixel signals of the pixels read in the first mode and the second pixel signals read in the second mode; and
output pixel signals after the correction processing as a still image signal.

6. The solid-state imaging device according to claim 1, wherein the circuitry is further configured to:
control reading of the pixel signals from the pixel array unit; and
adjust a line thinning-out rate in the first mode based on an exposure time of the pixels.

7. The solid-state imaging device according to claim 1, wherein based on the pixels of the pixel array unit include pixels of respective color components, the circuitry is further configured to perform the correction processing on the pixel signals for each color component.

8. A driving method, comprising: in a solid-state imaging device:
setting an amount of correction based on first pixel signals read in a first mode and second pixel signals read in a second mode, and a time until reading of the first pixel signals is performed in the first mode and a time from the reading in the first mode until reading of the second pixel signals is performed in the second mode; and
performing correction processing on the second pixel signals read in the second mode based on the first pixel signals read in the first mode and second pixel signals read in the second mode, wherein
the reading of the first pixel signals in the first mode is based on thinning out lines from a pixel array unit in which pixels that generate pixel signals are in a matrix, and the reading of the second pixel signals in the second mode is based on the lines thinned out in the first mode after the reading in the first mode.

9. An electronic device, comprising:

a solid-state imaging device that includes circuitry configured to:

set an amount of correction based on first pixel signals read in a first mode and second pixel signals read in a second mode, and a time until reading of the first pixel signals is performed in the first mode and a time from the reading in the first mode until reading of the second pixel signals is performed in the second mode; and perform correction processing on the second pixel signals read in the second mode based on the first pixel signals read in the first mode and the second pixel signals read in the second mode, wherein the reading of the first pixel signals in the first mode is based on thinning out lines from a pixel array unit in which pixels that generate pixel signals are in a matrix, and the reading of the second pixel signals in the second mode is based on the lines thinned out in the first mode after the reading in the first mode.

\* \* \* \* \*